United States Patent
Namihira

(10) Patent No.: US 9,807,272 B2
(45) Date of Patent: Oct. 31, 2017

(54) INFORMATION PROCESSING SYSTEM, DEVICE, AND INFORMATION PROCESSING METHOD

(71) Applicant: Kohsuke Namihira, Tokyo (JP)

(72) Inventor: Kohsuke Namihira, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 35 days.

(21) Appl. No.: 14/059,574

(22) Filed: Oct. 22, 2013

(65) Prior Publication Data

US 2014/0126016 A1    May 8, 2014

(30) Foreign Application Priority Data

Nov. 8, 2012  (JP) ................................ 2012-246015

(51) Int. Cl.
| | | |
|---|---|---|
| G06F 3/12 | (2006.01) | |
| H04N 1/32 | (2006.01) | |
| G06F 21/31 | (2013.01) | |

(52) U.S. Cl.
CPC ......... *H04N 1/32534* (2013.01); *G06F 21/31* (2013.01); *H04N 1/32539* (2013.01); *G06F 2221/2117* (2013.01)

(58) Field of Classification Search
None
See application file for complete search history.

(56) References Cited

U.S. PATENT DOCUMENTS

| | | | | |
|---|---|---|---|---|
| 2004/0100653 | A1* | 5/2004 | Azami | 358/1.15 |
| 2006/0238794 | A1* | 10/2006 | Hada | 358/1.13 |
| 2007/0229884 | A1* | 10/2007 | Tanaka | 358/1.15 |
| 2009/0279117 | A1* | 11/2009 | Kondo | 358/1.14 |
| 2011/0205586 | A1* | 8/2011 | Takahashi et al. | 358/1.15 |
| 2012/0026541 | A1* | 2/2012 | Kobayashi | 358/1.15 |
| 2012/0229846 | A1 | 9/2012 | Hadano | |
| 2012/0300252 | A1* | 11/2012 | Nagata | H04N 1/00244 358/1.15 |
| 2013/0163041 | A1* | 6/2013 | Sato | 358/1.15 |
| 2013/0242335 | A1* | 9/2013 | Naitoh | 358/1.14 |

FOREIGN PATENT DOCUMENTS

| | | |
|---|---|---|
| JP | 2011-192250 | 9/2011 |
| JP | 2012-190187 | 10/2012 |

OTHER PUBLICATIONS

Japanese Office Action dated Oct. 4, 2016.

* cited by examiner

*Primary Examiner* — Mohammad Ghayour
*Assistant Examiner* — Pawandeep Dhingra
(74) *Attorney, Agent, or Firm* — IPUSA, PLLC

(57) ABSTRACT

An information processing system includes a device, a first apparatus that is connected to the device via a first network, and a second apparatus that is connected to the device via a second network and is unable to receive a request from the first apparatus. The device includes an input part that inputs image data and a transmission part. In a case where the second apparatus corresponds to an output destination of the image data, the transmission part transmits the image data to the second apparatus via the second network. In a case where an apparatus that is capable of receiving data from the first apparatus corresponds to the output destination of the image data, the transmission part transmits to the first apparatus via the first network a transmission request to have the image data transmitted to the output destination.

7 Claims, 32 Drawing Sheets

FIG.8

| ORGANIZATION ID | USER NAME | PASSWORD | ROLE | CARD ID | STORAGE ACCOUNT INFORMATION | PURCHASED APPLICATION |
|---|---|---|---|---|---|---|
| 123 | — | — | — | — | StorageA,⟨ID⟩,⟨PASSWORD⟩ | SCAN DEVICE APPLICATION |
| 123 | A | ... | ADMINISTRATOR | card_a | | |
| 123 | B | ... | USER | card_b | | |
| 123 | C | ... | USER | card_c | | |
| 123 | D | ... | USER | card_d | | |

```
12345, "AAA", "A4 COLOR", "XX OFFICE"
67890, "BBB", "A2 COLOR", "YY OFFICE"
```

| ORGANIZATION ID | DEVICE NUMBER | DEVICE NAME | DEVICE TYPE | LOCATION |
|---|---|---|---|---|
| 123 | 12345 | AAA | A4 COLOR | XX OFFICE |
| 123 | 67890 | BBB | A2 COLOR | YY OFFICE |
| .. | .. | .. | .. | .. |

FIG.12

```
" B ", " password ", " card_b "
" C ", " password ", " card_c "
" D ", " password ", " card_d "
```

FIG.15

| ORGANIZATION ID | PROFILE NAME | GROUP | | PROJECT | | | |
|---|---|---|---|---|---|---|---|
| | | GROUP NAME | LAYOUT INFORMATION | PROJECT NAME | SCANNING CONDITION | PROCESS INFORMATION | STORAGE COOPERATION INFORMATION |
| 123 | A4pf | SALES | ... | DAILY REPORT | BOTH SIDES, 300dpi, jpeg | OCR | StorageA, /DAILY REPORT |
| | | | | CUSTOMER INFORMATION | SINGLE SIDE, 600dpi, pdf | — | StorageA, /CUSTOMER INFORMATION |
| | | | | PRODUCT INFORMATION | SINGLE SIDE, 600dpi, pdf | — | StorageA, /PRODUCT INFORMATION |
| | | | | SLIP | SINGLE SIDE, 600dpi, pdf | — | StorageA, /SLIP |
| | | | ... | ... | ... | ... | ... |
| 123 | A2pf | DEVELOPMENT | ... | ... | ... | ... | ... |

234

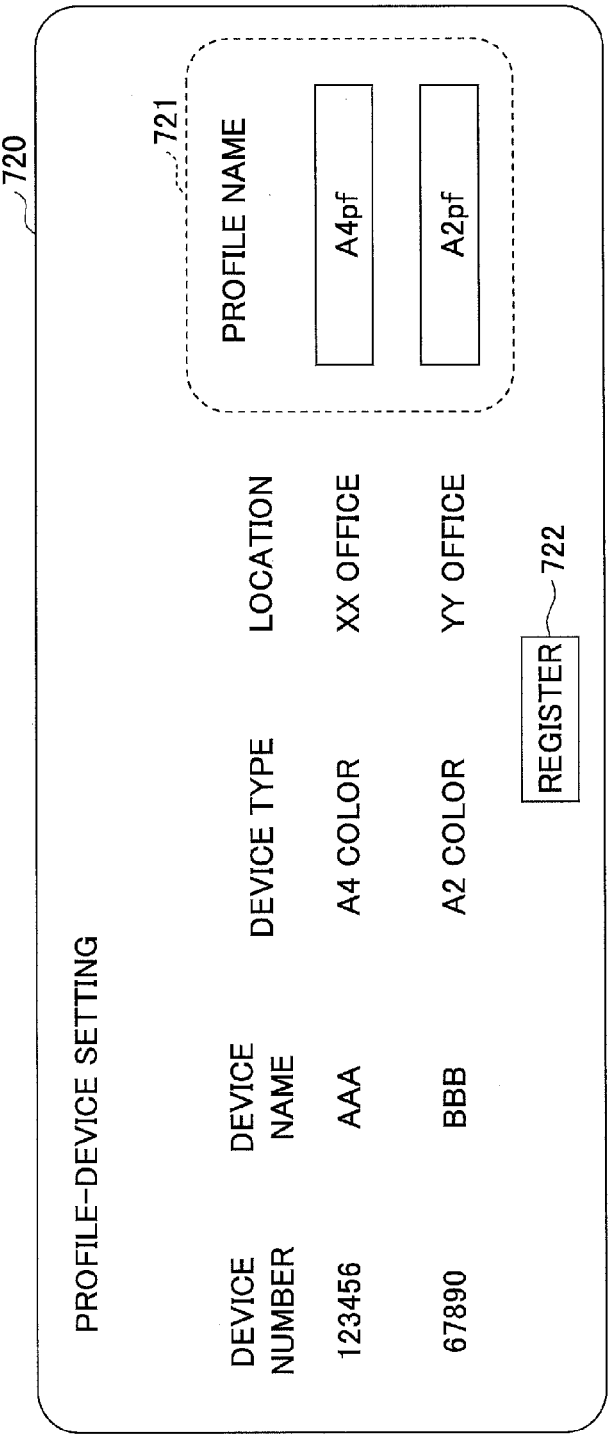

FIG.22

| ORGANIZATION ID | USER NAME | PASSWORD | ROLE | CARD ID | STORAGE ACCOUNT INFORMATION | PURCHASED APPLICATION |
|---|---|---|---|---|---|---|
| 123 | — | — | — | — | StorageA,⟨ID⟩,⟨PASSWORD⟩<br>SMB_1,⟨IP ADDRESS⟩,⟨DOMAIN NAME⟩,<br>⟨ACCOUNT NAME⟩,⟨PASSWORD⟩ | SCAN DEVICE APPLICATION |
| 123 | A | ... | ADMINISTRATOR | card_a | | |
| 123 | B | ... | USER | card_b | | |
| 123 | C | ... | USER | card_c | | |
| 123 | D | ... | USER | card_d | | |

| ORGANIZATION ID | PROFILE NAME | GROUP | | PROJECT | | | | |
|---|---|---|---|---|---|---|---|---|
| | | GROUP NAME | LAYOUT INFORMATION | PROJECT NAME | SCANNING CONDITION | PROCESS INFORMATION | STORAGE COOPERATION INFORMATION | |
| 123 | A4pf | SALES | | DAILY REPORT | BOTH SIDES, 300dpi, jpeg | OCR | StorageA, /DAILY REPORT | |
| | | | | CUSTOMER INFORMATION | SINGLE SIDE, 600dpi, pdf | — | SMB_1, /CUSTOMER INFORMATION | |
| | | | | PRODUCT INFORMATION | SINGLE SIDE, 600dpi, pdf | — | StorageA, /PRODUCT INFORMATION | |
| | | | | SLIP | SINGLE SIDE, 600dpi, pdf | — | StorageA, /SLIP | |
| | | DEVELOPMENT | ... | ... | ... | ... | ... | |
| 123 | A2pf | | | | | | | |

| ORGANIZATION ID | DEVICE NUMBER | DEVICE NAME | DEVICE TYPE | LOCATION | LINK DESTINATION URL | ACCESS TOKEN |
|---|---|---|---|---|---|---|
| 123 | 12345 | AAA | A4 COLOR | XX OFFICE | http://xxx/webui | |
| 123 | 67890 | BBB | A2 COLOR | YY OFFICE | http://yyy/webui | |
| .. | .. | .. | .. | .. | .. | |

232

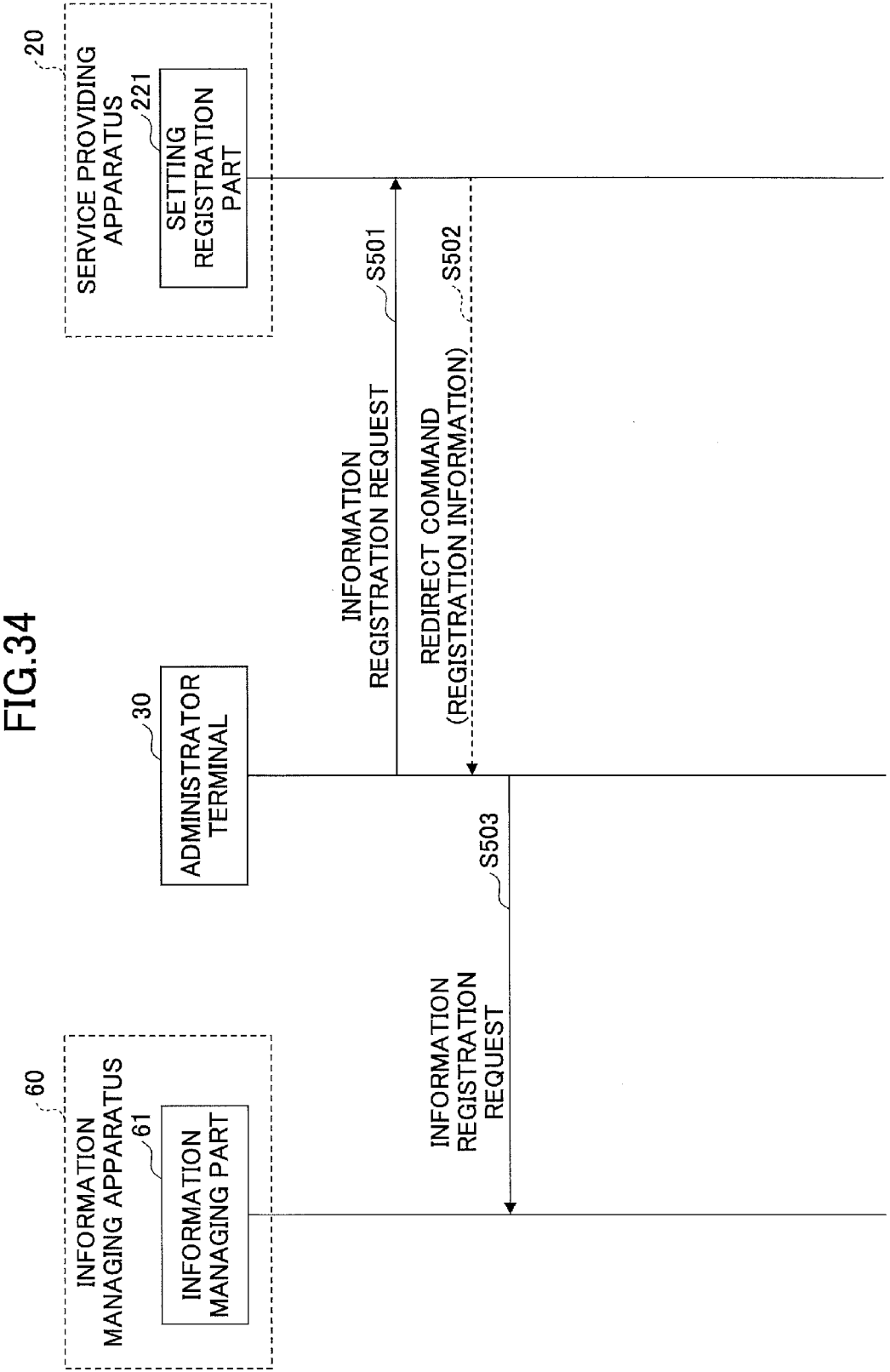

INFORMATION PROCESSING SYSTEM, DEVICE, AND INFORMATION PROCESSING METHOD

BACKGROUND OF THE INVENTION

1. Field of the Invention

The disclosures herein relate to an information processing system, a device, and an information processing method.

2. Description of the Related Art

Applications of service providing technology that involve executing software provided over a network such as the Internet rather than running an application program at an information processing apparatus directly operated by a user are becoming widespread. A cloud service is one known example of such service providing technology (See e.g., Japanese Laid-Open Patent Publication No. 2011-192250).

With respect to services associated with devices such as imaging devices, further value-added features may be offered to a user by providing a service as a cloud service or some other type of service provided over a network.

However, conventional service providing systems for such devices lack measures to adequately support cooperation between the device and the service provided over the network. Such a problem is not limited to cloud services but applies universally to any type of service provided via a network including a service provided by an ASP (Application Service Provider) or a web service, for example.

SUMMARY OF THE INVENTION

It is an object of at least one embodiment of the present invention to provide a technique for enabling adequate cooperation between a device and a service provided over a network.

According to one embodiment of the present invention, an information processing system includes a device, a first apparatus that is connected to the device via a first network, and a second apparatus that is connected to the device via a second network and is unable to receive a request from the first apparatus. The device includes an input part that inputs image data and a transmission part. In a case where the second apparatus corresponds to an output destination of the image data, the transmission part transmits the image data to the second apparatus via the second network. In a case where an apparatus that is capable of receiving data from the first apparatus corresponds to the output destination of the image data, the transmission part transmits to the first apparatus via the first network a transmission request to have the image data transmitted to the output destination.

According to an aspect of the present invention, adequate cooperation between a device and a service provided over a network may be enabled.

BRIEF DESCRIPTION OF THE DRAWINGS

FIG. 8 illustrates an exemplary configuration of a user information storage part;

FIG. 9 illustrates an exemplary manner of describing device information in a device information file;

FIG. 10 illustrates an exemplary configuration of a device information storage part;

FIG. 12 illustrates an exemplary manner in which user information is described in a user information file;

FIG. 15 illustrates an exemplary configuration of a profile storage part;

FIG. 16 illustrates an exemplary display of a profile-device setting screen;

FIG. 17 illustrates an exemplary configuration of a profile-device correspondence storage part;

FIG. 22 illustrates an exemplary manner in which storage account information is registered in the user information storage part according to the second embodiment;

FIG. 23 illustrates an exemplary manner in which a profile is registered in the profile storage part according to the second embodiment;

FIG. 26 illustrates an exemplary configuration of the device information storage part according to the third embodiment;

FIG. 34 is a sequence chart illustrating exemplary process steps for registering information in the information managing apparatus.

DESCRIPTION OF THE PREFERRED EMBODIMENTS

In the following, embodiments of the present invention are described with reference to the accompanying drawings.

Figure 1:
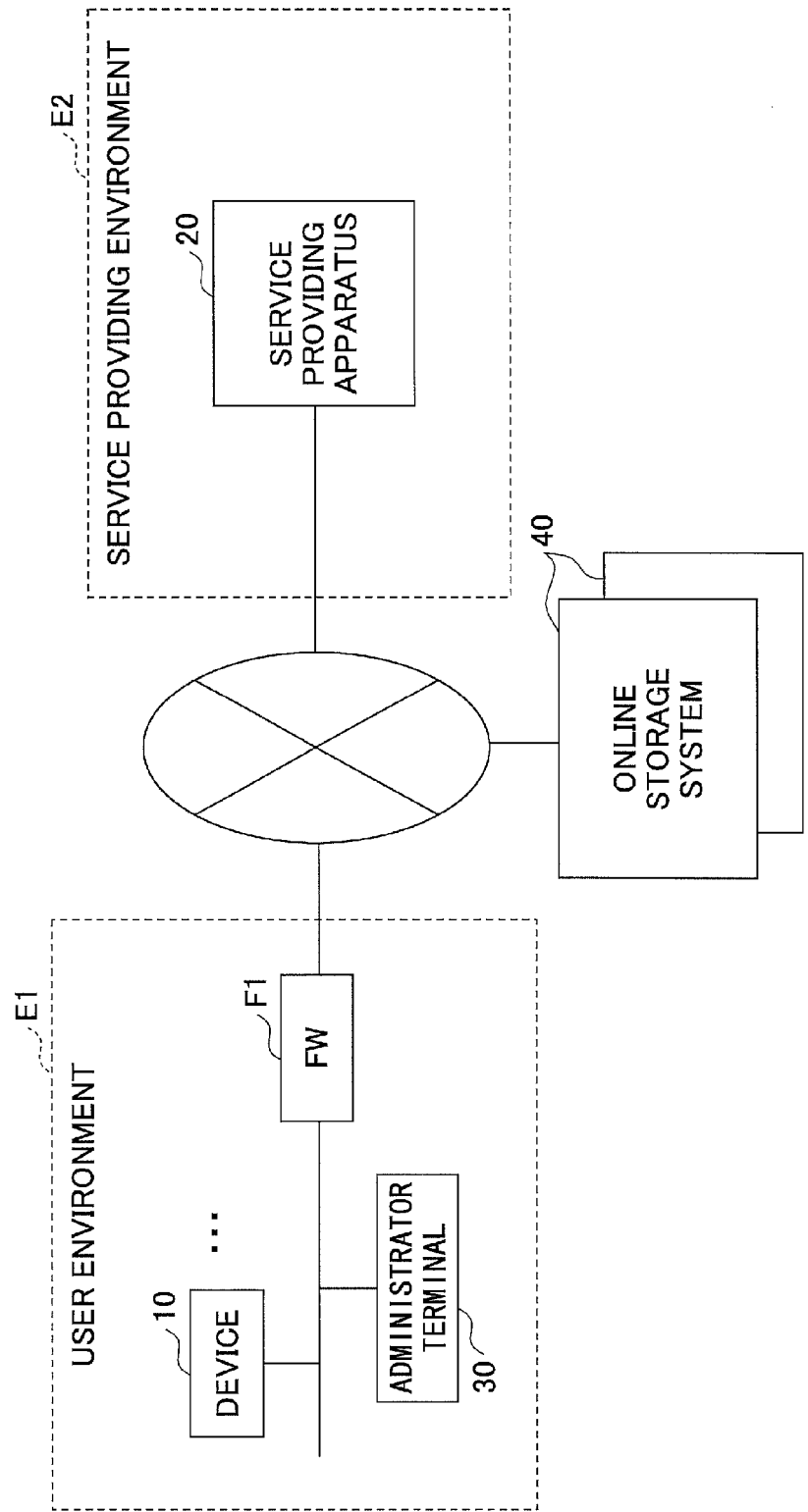
FIG. 1 illustrates an exemplary configuration of an information processing system according to a first embodiment of the present invention.

FIG. 1 illustrates an exemplary configuration of an information processing system 1 according to a first embodiment of the present invention. In the example illustrated in FIG. 1, the information processing system 1 includes a service providing environment E2, a user environment E1, and an online storage system 40 that are connected via a wide area network such as the Internet so that they may establish communication with each other.

The service providing environment E2 is a system environment that provides a cloud service to an organization via a network. Note that although a cloud service is illustrated as an exemplary service provided via a network in the descriptions below, embodiments of the present invention may also be implemented in systems that provide some other type of service via a network such as a service provided by an ASP or a web service.

The service providing environment E2 includes a service providing apparatus 20. The service providing apparatus 20 is configured to provide a predetermined service via a network. For example, the service providing apparatus 20 may be configured to provide the so-called "ScanToStorage service". The "ScanToStorage service" refers to a service that stores image data scanned by a device 10 within the user environment E1 in a pre-designated storage destination. Note that in certain embodiments, the service providing apparatus 20 may be arranged at the user environment E1. That is, the service providing environment E2 may be included in the user environment E1, for example.

The user environment E1 is a system environment of an organization such as a company to which a user of the device 10 belongs. The user environment E1 includes at least one device 10 and an administrator terminal 30 that are connected via a network such as a LAN (local area network).

In the example described below, the device 10 is assumed to be an imaging device having a scanning function. For example, the device 10 may be a multifunction peripheral (MFP) having additional functions such as a printing function, a copying function, and a facsimile communication function as well as the scanning function.

The administrator terminal 30 is a terminal used by an administrator of the device 10 within the user environment E1. For example, the administrator terminal 30 may be a PC (personal computer), a PDA (personal digital assistant), a tablet terminal, a smart phone, or a cell phone.

The user environment E1 further includes a firewall F1. The firewall F1 may be any type of firewall. The firewall F1 may block a request that is transmitted from the exterior to the user environment E1, for example. Thus, the firewall F1 may prevent an active request from being transmitted from the service providing apparatus 20 to the device 10 within the user environment E1, for example.

The online storage system 40 is a computer system that provides a cloud service that is referred to as "online storage" via a network. "Online storage" refers to a service that rents out a storage area for storing data. In the present example, the storage area rented out by the online storage system 40 may be one candidate storage destination for image data that is to be stored using the ScanToStorage service provided by the service providing apparatus 20.

Figure 2:
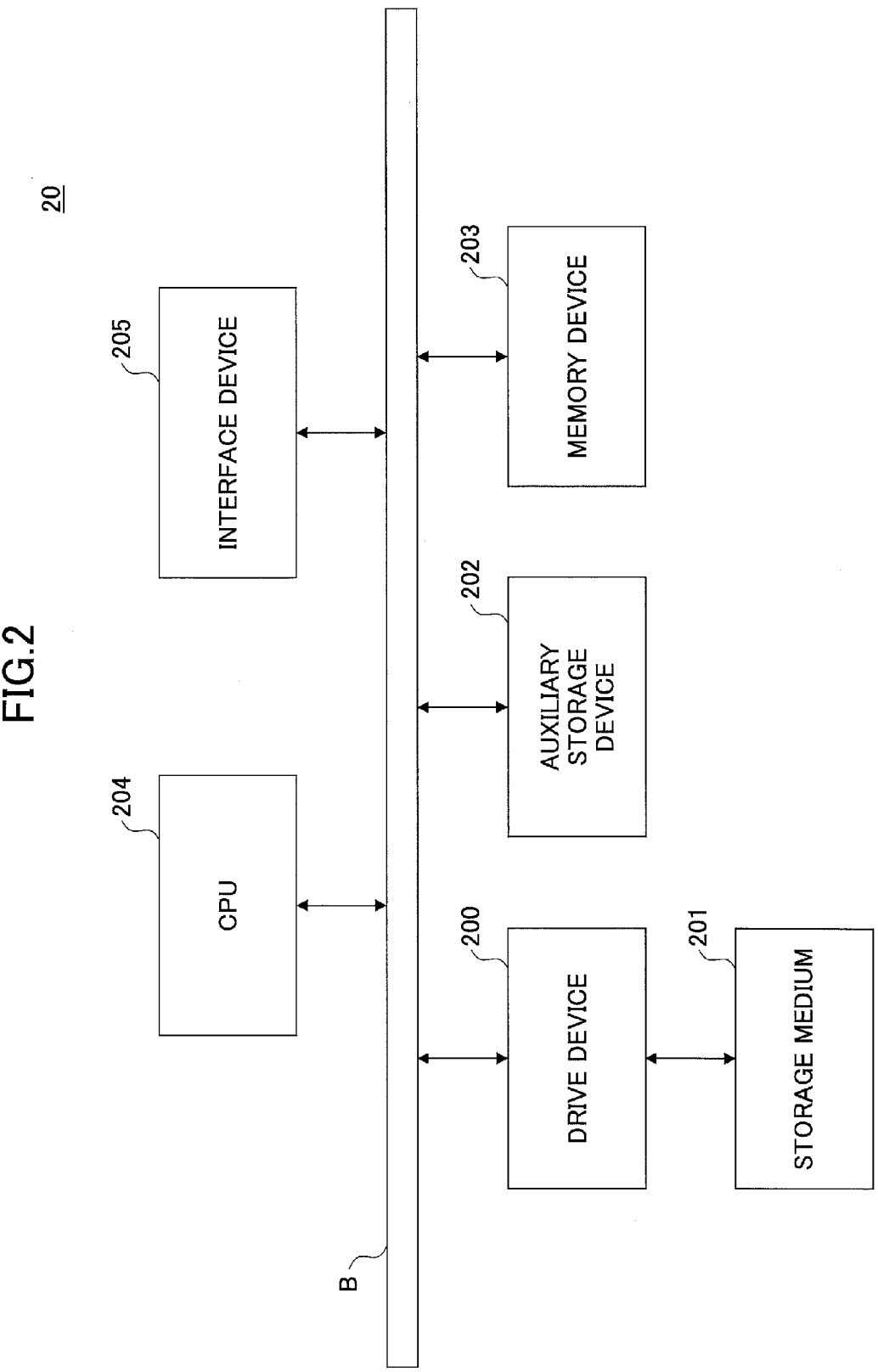
FIG. 2 illustrates an exemplary hardware configuration of a service providing apparatus according to the first embodiment.

FIG. 2 illustrates an exemplary hardware configuration of the service providing apparatus 20 according to the first embodiment. In FIG. 2, the service providing apparatus 20 includes a drive device 200, an auxiliary storage device 202, a memory device 203, a CPU (central processing unit) 204, and an interface device 205.

A program for executing a process of the service providing apparatus 20 may be stored in a storage medium 201, which may be a CD-ROM (compact disc read-only memory), for example. When the storage medium 201 storing the program is loaded into the drive device 200, the program may be installed in the auxiliary storage device 202 from the storage medium 201 via the drive device 200. Note however, that the program does not necessarily have to be installed via the storage medium 201, but may alternatively be downloaded from another computer via a network, for example. The auxiliary storage device 202 is configured to store the installed program as well as other necessary files and data.

The memory device 203 reads the program from the auxiliary storage device 202 and stores the read program in response to the issuance of a program activation command. The CPU 204 executes various functions of the service providing apparatus 20 according to the program stored in the memory device 203. The interface device 205 is used as an interface for establishing connection with a network.

In certain embodiments, the service providing apparatus 20 may include a plurality of computers having the hardware configuration as illustrated in FIG. 2. That is, in certain embodiments, a plurality of computers may be configured to execute one or more processes of the service providing apparatus 20 that are described in detail below.

Figure 3:
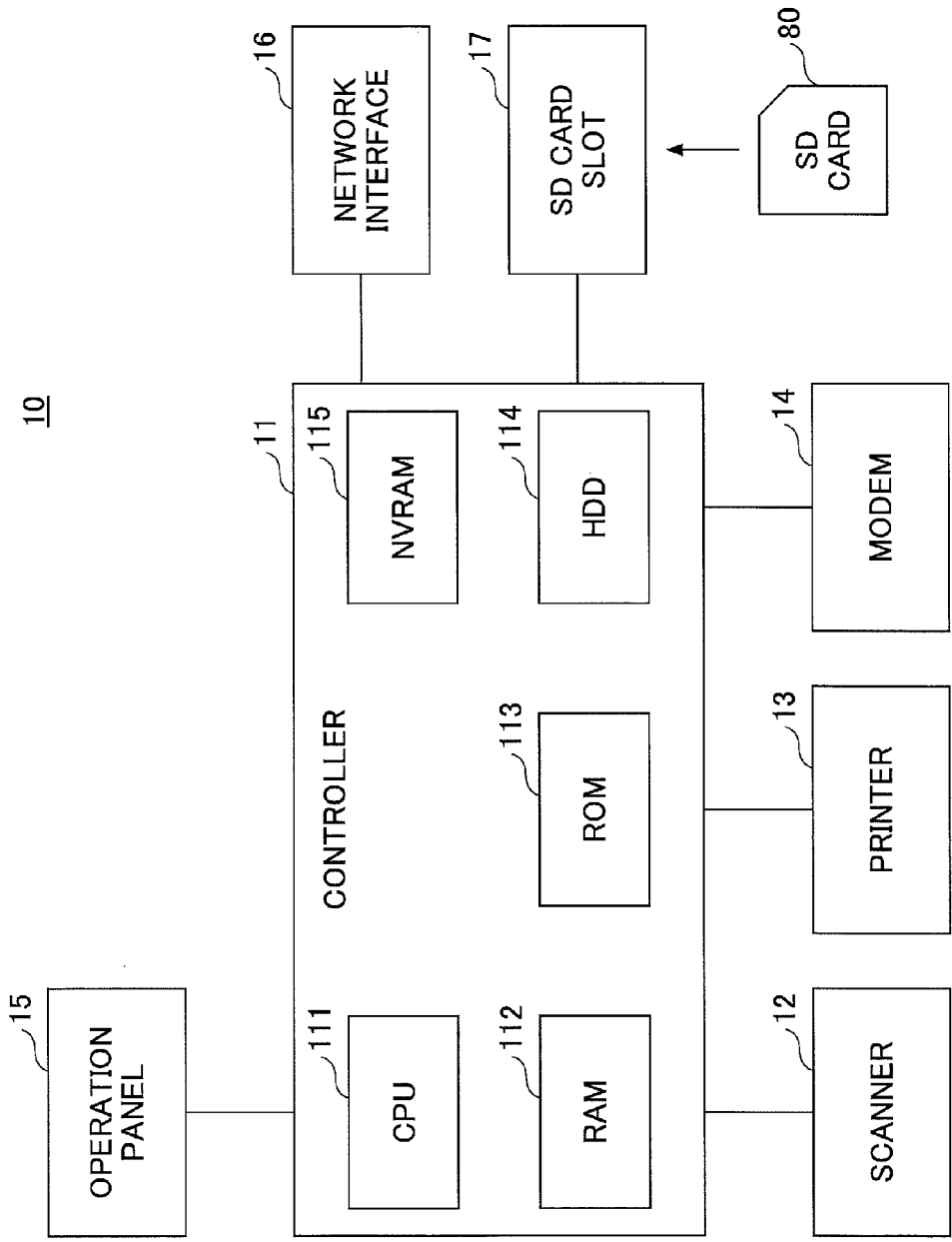
FIG. 3 illustrates an exemplary hardware configuration of a device according to the first embodiment.

FIG. 3 illustrates an exemplary hardware configuration of the device 10 according to the first embodiment. In FIG. 3, the device 10 includes hardware components such as a controller 11, a scanner 12, a printer 13, a modem 14, an operation panel 15, a network interface 16, and a SD card slot 17.

The controller 11 includes a CPU 111, a RAM (random access memory) 112, a ROM (read-only memory) 113, a HDD (hard disk drive) 114, and a NVRAM (non-volatile random access memory) 115. The ROM 114 stores various programs and data that are used by the programs. The RAM 112 is used as a storage area for loading a program and a working area for the loaded program. The CPU 111 implements one or more functions of the device 10 by executing the program loaded in the RAM 112. The HDD 114 stores various programs and data that are used by the programs. The NVRAM 115 stores various items of information such as setting information.

The scanner 12 is hardware for scanning (inputting) image data of a document. The printer 13 is hardware for printing print data on a printing sheet. The modem 14 is hardware for establishing connection with a telephone line and is used to transmit and receive image data through facsimile communication. The operation panel 15 is hardware including an input unit such as a button for accepting an input from a user and a display unit such as a liquid crystal display panel. The network interface 16 is hardware for establishing connection with a wireless or wired network such as a LAN. The SD card slot 17 is used to read programs stored in an SD card 80. In the present embodiment, the programs stored in the SD card 80 as well as the programs stored in the ROM 113 may be loaded on the RAM 112 and executed in the device 10. In other embodiments, another type of storage medium such as a CD-ROM or a USB (universal serial bus) may be used instead of the SD card 80. That is, the type of the storage medium storing the programs to be read and loaded on the RAM 112 of the device 10 is not limited to a particular type of storage medium. Also, the SD card slot 17 may be replaced by suitable hardware for reading the programs according to the type of storage medium used.

Figure 4:
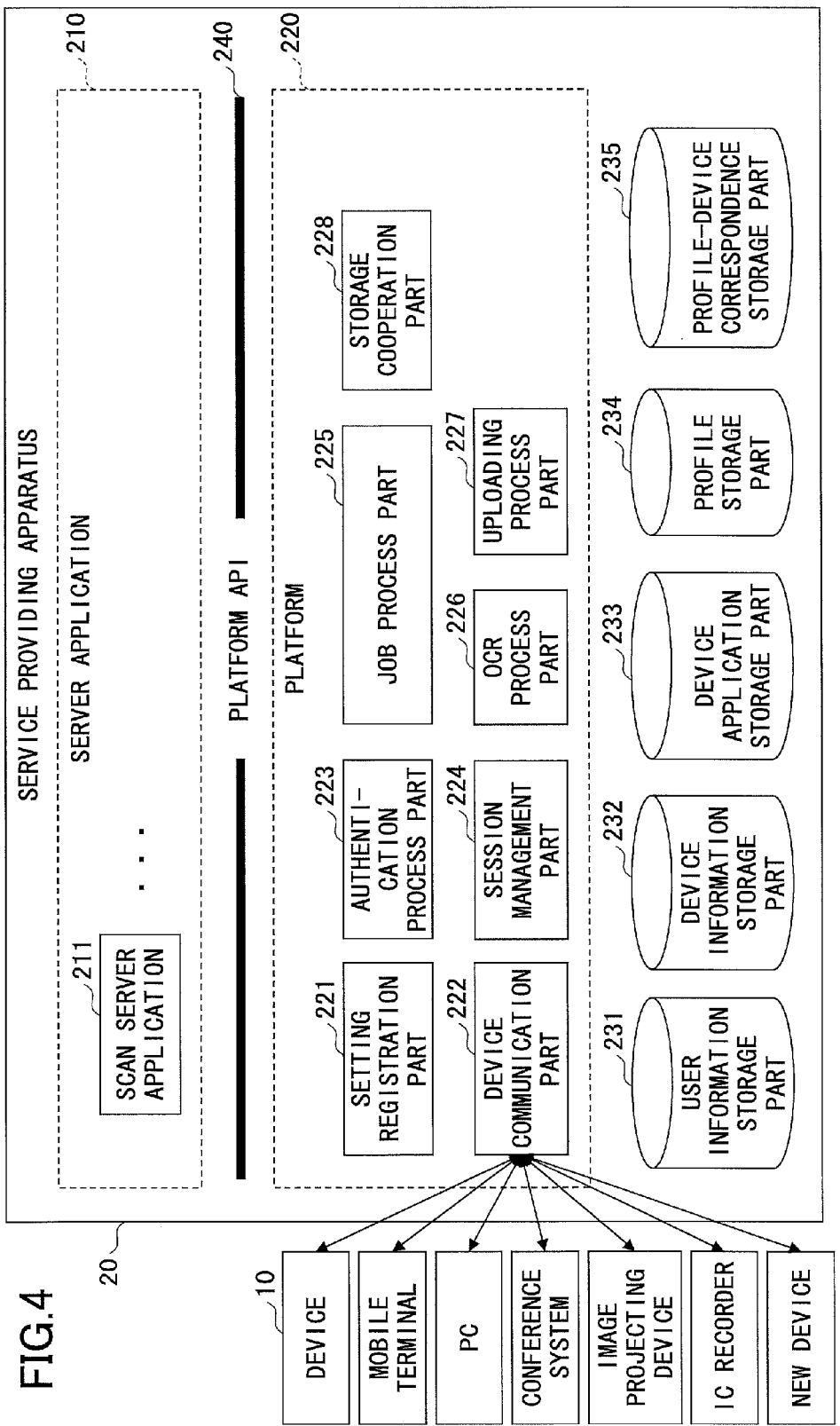
FIG. 4 illustrates an exemplary functional configuration of the service providing apparatus according to the first embodiment.

FIG. 4 illustrates an exemplary functional configuration of the service providing apparatus 20 of the first embodiment. In FIG. 4, the service providing apparatus 20 includes software components such as a server application 210 and a platform 220. These software components are implemented by one or more programs that are installed in the service providing apparatus 20 and executed by the CPU 204.

The service providing apparatus 20 also includes a user information storage part 231, a device information storage part 232, a device application storage part 233, a profile storage part, and a profile-device correspondence storage part 235. These storage parts may be implemented by the auxiliary storage device 202 or some other storage device that is connected to the service providing apparatus 20 via a network, for example.

The server application 210 is an application program for implementing a service provided by the service providing apparatus 20. However, it is assumed in the following example that the service provided by the service providing apparatus 20 cannot be completed by the server application 210 alone. That is, the service is completed through cooperation of the server application 210 with the device 10. Further, the service may be completed through cooperation with some other cloud service such as the online storage system 40, for example. Note that the term "server application" is used to refer to an application program at the service providing apparatus 20 side as distinguished from an application program at the device 10 side (e.g., scan device application 125, which is described below).

In FIG. 4, a scan server application 211 is illustrated as an example of the server application 210. The scan server application 211 is an application program for executing processes of the ScanToStorage service.

The platform 220 may include a common function of a plurality of the server applications 210 or a basic function used by the plurality of the server applications 210. In FIG. 4, the platform 220 includes a setting registration part 221, a device communication part 222, an authentication process part 223, a session management part 224, a job process part 225, an OCR (optical character recognition) process part 226, an uploading process part 227, and a storage cooperation part 228. The functions enabled by these functional parts are published to the server application 210 via a platform API 240. That is, the server application 210 is able to use the functions of the platform 220 to the extent they are published by the platform API 240.

The setting registration part 221 executes a setting registration process that needs to be performed before starting use of a service provided by the service providing apparatus 20. The setting registration part 221 may be used to register information in the user information storage part 231, the device information storage part 232, the profile storage part 234, and the profile-device correspondence storage part 235, for example.

The user information storage part 231 stores information relating to a user of a service provided by the service providing apparatus 20. The device information storage part 232 stores information relating to the one or more devices 10 that are to cooperate with the service provided by the service providing apparatus 20 within the system environment of the user (i.e., user environment E1). That is, the service provided by the service providing apparatus 20 such as the ScanToStorage service is implemented through cooperation of the server application 210 with the device 10 within the user environment E1.

The device application storage part 233 stores an application program that needs to be installed in the device 10 for enabling cooperation between the server application 210 and the device 10 (referred to as "device application" hereinafter). The profile storage part 234 stores one or more profiles corresponding to screen information. A profile may include configuration information of an operation screen of a device application and information on a process to be executed in response to an operation of the operation screen, for example. The profile-device correspondence storage part 235 stores information relating to the correspondence between a profile and the device 10. That is, in the present embodiment, a corresponding profile for an operation screen of a device application may be assigned to each of the one or more devices 10 within the user environment E1.

The device communication part 222 controls communication between the service providing apparatus 20 and the device 10. The authentication process part 223 authenticates the user of the administrator terminal 30 or the user of the device 10. Also the authentication process part 223 may act as a proxy for executing a login process for gaining login access to the online storage system 40 during execution of the ScanToStorage service, for example. The session management part 224 manages a session between the service providing apparatus 20 and the device 10 during their cooperation.

The job process part 225 controls execution of a job in response to a job execution request from the server application 210. The OCR process part 226 executes an OCR process on image data to be processed in a case where the job execution request from the server application 210 calls for the execution of an OCR process. The uploading process part 227 executes an uploading process in a case where the job execution request from the server application 210 calls for execution of a process of uploading data via a network. Note that storing data in the online storage system 40 is one example of such an uploading process.

The storage cooperation part 228 enables cooperation between the service providing apparatus 20 and the online storage system 40.

In FIG. 4, in addition to the device 10 such as an imaging device, a mobile terminal, a PC, a conference system, an image projecting device, an IC recorder, and some other new device are illustrated as exemplary devices that may establish communication with the service providing apparatus 20.

Also, note that the manner in which software components and storage parts of the service providing apparatus 20 are arranged in FIG. 4 is merely one illustrative example. That is, the software components and storage parts of the service providing apparatus 20 do not necessarily have to be arranged into a layer configuration as illustrated in FIG. 4. Rather, the software components and storage parts of the service providing apparatus 20 may be arranged in any suitable configuration so long as cooperation between the service providing apparatus 20 and the device 10 is enabled.

Figure 5:
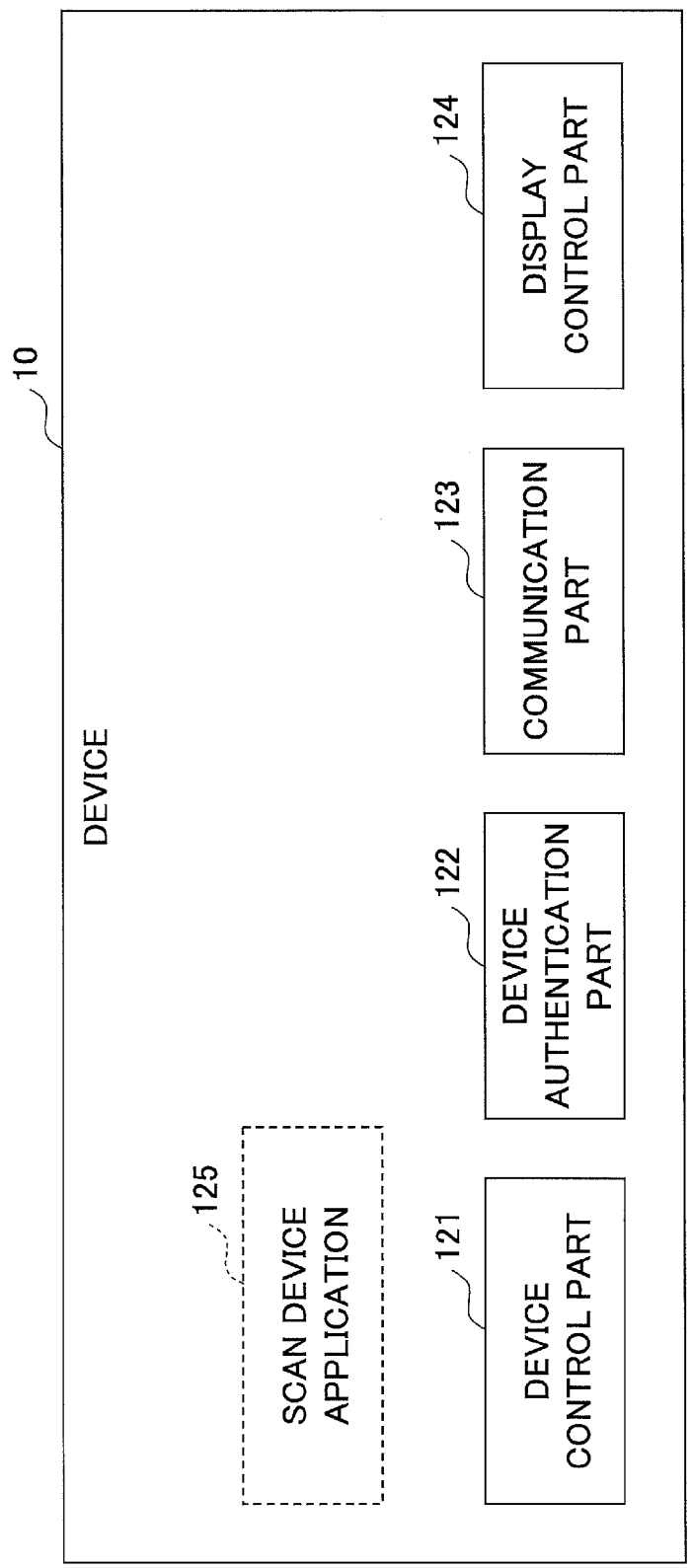
FIG. 5 illustrates an exemplary functional configuration of the device according to the first embodiment.

FIG. 5 illustrates an exemplary functional configuration of the device 10 according to the first embodiment. In FIG. 5, the device 10 includes a device control part 121, a device authentication part 122, a communication part 123, and a display control part 124. These functional components may be implemented by one or more programs that are installed in the device 10 and executed by the CPU 111, for example.

The device control part 121 controls operations of hardware components of the device 10. The device authentication part 122 executes a process for authenticating the operator (user) of the device 10. The communication part 123 controls communication established via a network. The display control part 124 executes a process for displaying a screen on the operation panel 15.

In FIG. 5, a scan device application 125 is illustrated by a broken line. The scan device application 125 is an example of a device application that is installed in the device 10 to enable the device 10 to cooperate with the service providing apparatus 20 upon implementing the ScanToStorage service provided by the service providing apparatus 20. The device application may be any form of application program that may be installed in the device 10. For example, an application program that may also function as a server application may be installed in the device 10 as the device application.

In the present embodiment, the scan device application 125 is not installed in the device 10 from the start. Rather, the scan device application 125 is installed in the device 10 during preparatory operations for enabling use of the ScanToStorage service. For this reason, the scan device application 125 is illustrated by broken lines in FIG. 4. However, in alternative embodiments, the scan device application 125 may be installed in the device 10 from the start.

In the following, operations of the information processing system 1 according to the first embodiment are described.

To enable use of the ScanToStorage service within the user environment E1, preparatory operations have to be performed such as registering various items of information relating to the user environment E1 in the service providing apparatus 20 and installing the scan device application 125 in the device 10. Thus, in the following, process steps that are executed in connection with such preparatory operations are described. The preparatory operations described below may be performed by the administrator of the one or more devices 10 within the user environment E1 (simply referred to as "administrator" hereinafter) using the administrator terminal 30, for example.

Figure 6:
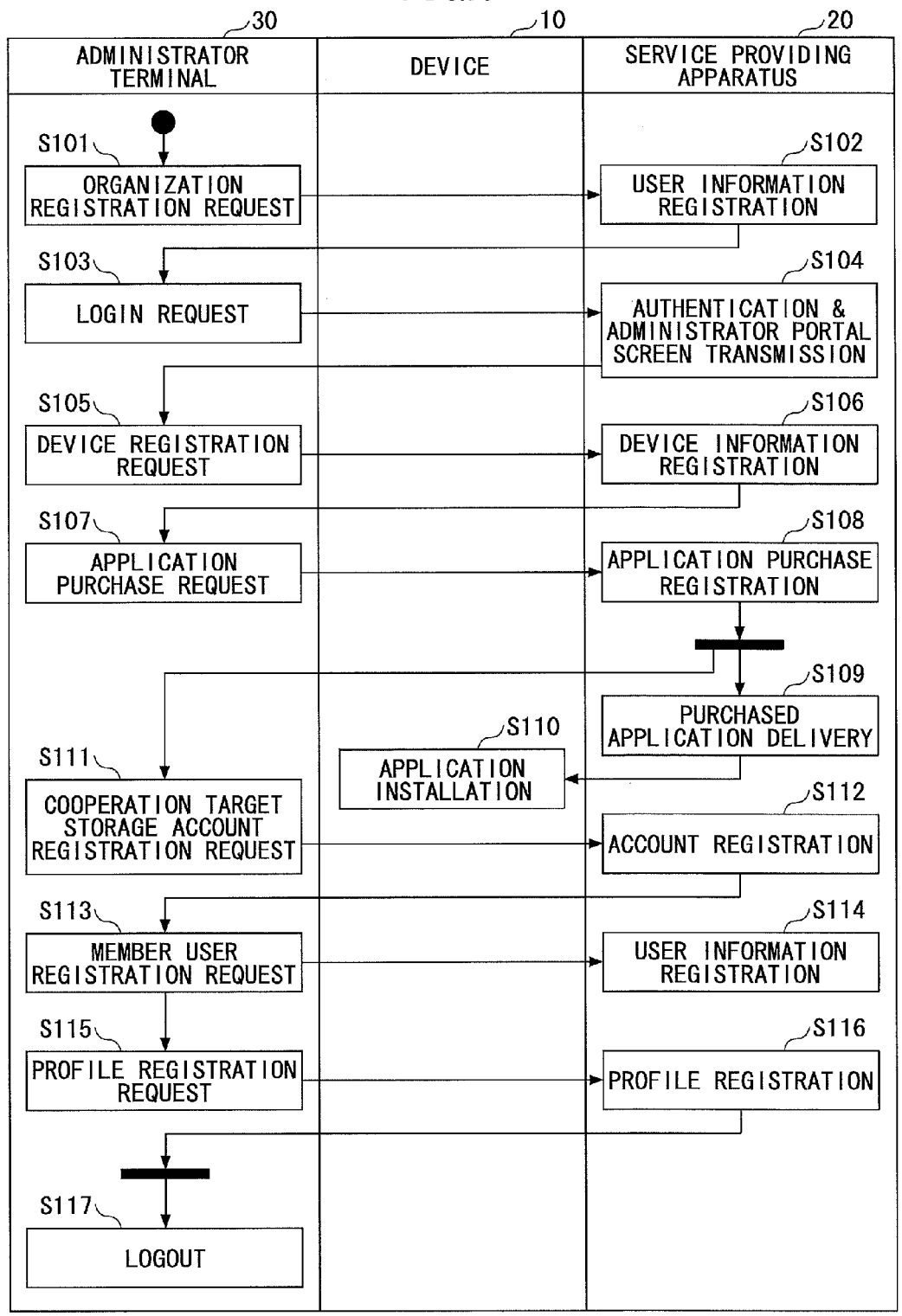
FIG. 6 illustrates exemplary process steps of preparatory operations performed by an administrator to enable use of a service.

FIG. 6 illustrates exemplary process steps that are executed in connection with the preparatory operations.

In step S101, the administrator terminal 30 transmits an organization registration request to the service providing apparatus 20 in response to a command input by the administrator. The organization registration request refers to a registration request for registering information relating to an organization that is to use the service provided by the service providing apparatus 20. For example, the organization may be a single company. Alternatively, the organization may be one department within a single company. That is, in some cases, a single company may include a plurality of organizations. In the present example, it is assumed that the user environment E1 corresponds to a system environment of one organization. Note that an organization is not limited to a company or a department within a company, but may be any collective entity such as a group or a social circle. An organization may also be an entity constituting a single person, for example.

The organization registration request may be issued through operation of an operation screen as described below, for example.

Figure 7:
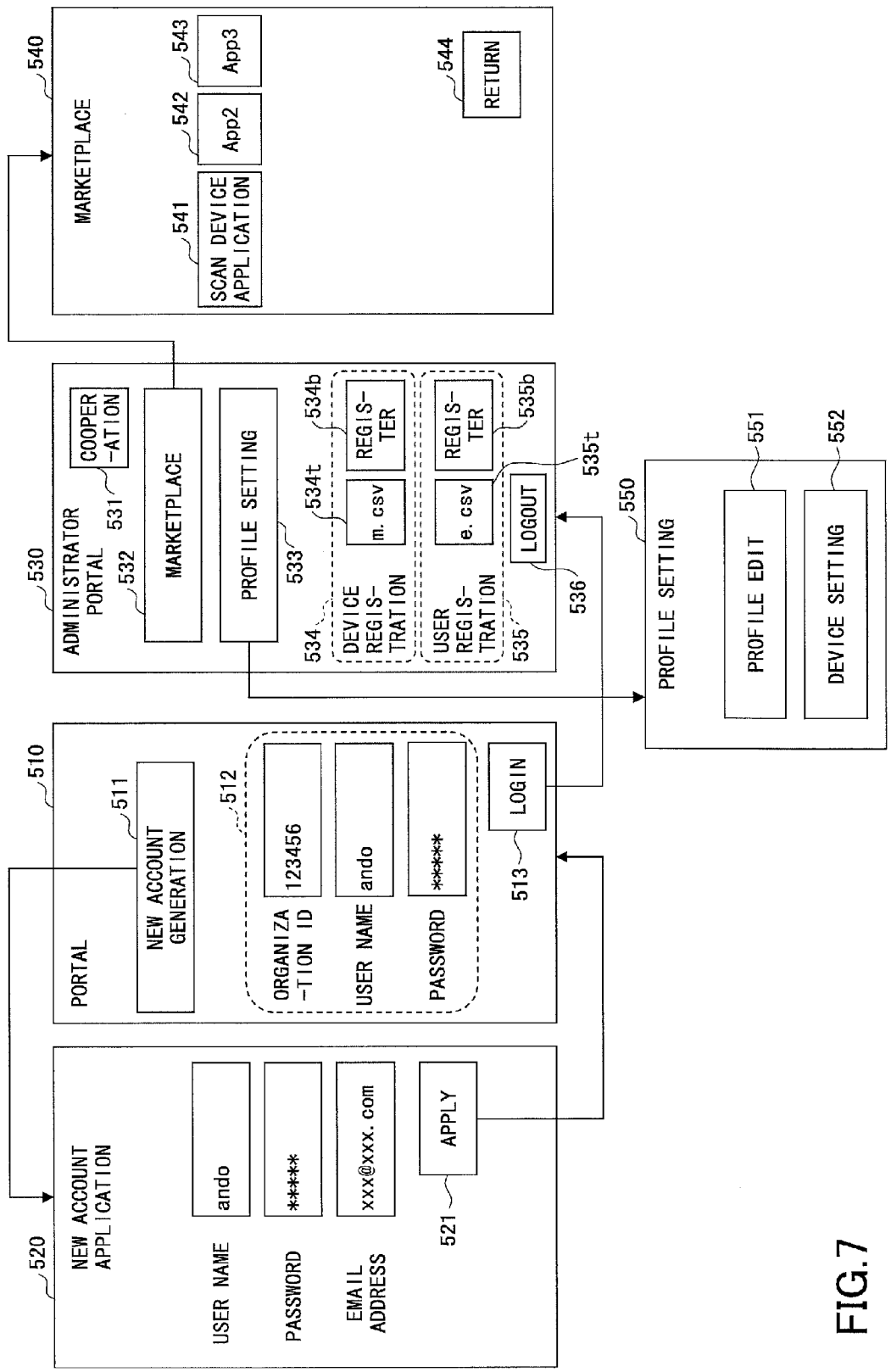
FIG. 7 illustrates exemplary screens that are displayed at an administrator terminal during the preparatory operations.

FIG. 7 illustrates exemplary screens that may be displayed at the administrator terminal 30 during the preparatory operations. In the example illustrated in FIG. 7, a portal screen 510 is displayed at the administrator terminal 30 at the start of the preparatory operations. The portal screen 510 acts as a window to the service provided by the service providing apparatus 20. Note that the various screens illustrated in FIG. 7 may be displayed based on a webpage including HTML data that is provided by the service providing apparatus 20, for example. That is, although not mentioned in the descriptions below, HTTP (HyperText Transfer Protocol) communication is established between the administrator terminal 30 and the service providing apparatus 20 upon switching from one screen to another screen.

The portal screen 510 includes a new account generation button 511, a login information input area 512, and a login button 513.

To register an organization, the administrator presses the new account generation button 511. When the new account generation button 511 is pressed, a new account application screen 520 is displayed at the administrator terminal 30. Note that arrows extending from a button of one screen to another screen in FIG. 7 indicate that a screen display is switched from the one screen to the other screen when the corresponding button is pressed.

When a user name, a password, and an email address of the administrator is input to the new account application screen 520 and an apply button is 521 is pressed, the administrator terminal 30 includes the input user name, password, and email address in an organization registration request and transmits the organization registration request to the service providing apparatus 20.

Referring back to FIG. 6, in step S102, when to the new account application screen 520 receives the organization registration request from the administrator terminal 30, the setting registration part 221 registers the information included in the organization registration request in the user information storage part 231.

FIG. 8 illustrates an exemplary configuration of the user information storage part 231. In FIG. 8, the user information storage part 231 registers information items such as "organization ID," "user name," "password," "role," "card ID," "storage account information," and "purchased application" for each record.

The "organization ID" is an identifier that is assigned to each user environment E1; namely, to each organization such as a company user that uses the service provided by the service providing apparatus 20. The "user name," "password," "role," and "card ID" represent information relating to each individual user that is a constituent member of the organization identified by the organization ID (simply referred to as "member user" hereinafter).

The "role" is an information item for identifying the administrator among the member users. That is, a member user who is the administrator of the device 10 within the user environment E1 is registered as "administrator," and member users other than the administrator are registered as "user." The "card ID" is an identifier assigned to an IC card that is used by a member user upon logging into the device 10. The "storage account information" is account information of an online storage used by the organization identified by the organization ID. Such account information may be used as authentication information to be presented to the online storage system 40 upon storing image data scanned by the device 10 in the online storage system 40. Under the information item "purchased application," a list of one or more identifiers of applications purchased by the organization identified by the organization ID (simply referred to as "application ID" hereinafter) is registered. Note that although the name of the purchased application is listed under the information item "purchased application" in FIG. 8, the application ID may alternatively be a string of numbers and/or characters, for example.

Note that a record stored within the user information storage part 231 that does not have a user name registered corresponds to a record for the organization (user environment E1) (referred to as "organization record" hereinafter). A record having a user name registered corresponds to a record for a member user (referred to as "member record" hereinafter). In the illustrated example of FIG. 8, the information items "storage account information" and "purchased application" are valid information items for an organization record. However, in other examples, the information item "storage account information" may also be valid for a member record. Note that in the following descriptions, a member record that has "administrator" registered as role information is referred to as "administrator record," and a member record that has "user" registered as role information is referred to as "user record."

Referring back to FIG. 6, in step S102, one organization record and one administrator record are generated. An organization ID is registered in the organization record. That is, the organization ID is assigned to the organization upon generating the organization record. Also, information items such as organization ID, user name, password, and role are registered in the administrator record. The organization ID registered in the administrator record may be the same as the organization ID registered in the organization record. The user name and password included in the organization registration request are registered as the user name and password of the administrator record. Also, "administrator" is registered as the role.

Note that other information items of the organization record and the administrator record, and additional user records may be registered or generated in processes described below.

Next, the setting registration part 221 may transmit an email indicating that the organization registration has been properly performed (referred to as "registration notification mail" hereinafter) to the email address included in the organization registration request, for example. The registration notification mail may include the organization ID that has been assigned to the organization, for example. In an alternative example, notification of the proper completion of the organization registration may be included in an HTTP response to an HTTP request that includes the organization registration request. Also, the organization ID may be designated by the administrator via the new account application screen 520, for example.

After the organization registration is properly completed, the administrator inputs the registered organization ID, user name, and password in the login information input area 512 of the portal screen 510, and presses the login button 513. In response to the pressing of the login button 513, the administrator terminal 30 transmits a login request to the service providing apparatus 20 (S103). The login request includes the organization ID, user name, and password input to the login information input area 512.

Upon receiving the login request from the administrator terminal 30, the authentication process part 223 of the service providing apparatus 20 performs user authentication of the user (administrator) making the login request. The authentication process part 223 performs the user authentication based on whether a record having the value "administrator" registered as role information and having the organization ID, user name, and password included in the login request is stored in the user information storage part 231. If such a record is stored in the user information storage part 231, the administrator may be successfully authenticated (S104). If such a record is not stored in the user information storage part 231, the authentication results in failure. When the authentication is successful, the setting registration part 221 transmits a webpage that prompts the display of a dedicated portal screen for the administrator identified by the user name included in the login request (referred to as "administrator portal screen 530" hereinafter) to the administrator terminal 30. Note that in the following descriptions, the administrator that has made the login request is referred to as "login administrator."

The administrator terminal 30 displays the administrator portal screen 530 based on the webpage transmitted from the service providing apparatus 20. In FIG. 7, the administrator portal screen 530 includes a cooperation button 531, a marketplace button 532, a profile setting button 533, a device registration area 534, and a user registration area 535.

In the illustrated example, the administrator inputs in a textbox 534*t* of the device registration area 534 a file name of a file describing information relating one or more devices 10 that are to cooperate with the ScanToStorage service (referred to as "device information file" hereinafter) and presses a register button 534*b*.

Device information of one device 10 may include information items such as device number, device name, device type, and location, for example. Values representing such information items may be described in a device information file having a format as illustrated in FIG. 9, for example.

FIG. 9 illustrates an exemplary manner of describing device information in a device information file. In the example illustrated in FIG. 9, device information is described using the CSV (Comma Separated Values) format in which the values representing the information items are separated by commas. However, the format used to describe the device information included in the device information file is not limited to the CSV format, but may be some other format such as the XML (eXtensible Markup Language) format, for example.

The device number is unique identification information for identifying each individual device 10. For example, a manufacturing number or a serial number may be used as the device number. The device name may be synonymous with model name. The device type is information succinctly describing a feature of the corresponding model. The location describes where the device 10 is located within the user environment E1.

Referring back to FIGS. 6 and 7, when the file name of the device information is input to the textbox 534*t* and the register button 534*b* is pressed by the administrator, the administrator terminal 30 transmits a device registration request including the device information described in the device information file to the service providing apparatus 20 (S105).

Upon receiving the device registration request from the administrator terminal 30, the setting registration part 221 of the service providing apparatus 20 registers the device information included in the device registration request in the device information storage part 232 in association with the organization ID of the organization of the login administrator (S106).

FIG. 10 illustrates an exemplary configuration of the device information storage part 232. In FIG. 10, the device information storage part 232 stores a record for each registered device 10. Each record includes information items such as "organization ID," "device number," "device name," "device type," and "location," for example. Note that the association of each device 10 with its corresponding organization is stored in the device information storage part 232.

Next, referring back to FIGS. 6 and 7, the administrator presses the marketplace button 532 of the administrator portal screen 530 to purchase the scan device application 125 that needs to be installed in the device 10 before receiving the ScanToStorage service. When the marketplace button 532 is pressed by the administrator, the administrator terminal 30 displays a marketplace screen 540.

The marketplace screen 540 includes buttons corresponding to the device applications stored in the device application storage part 233. In the example illustrated in FIG. 7, three buttons 541-543 corresponding to three device applications are included in the marketplace screen 540. Of the three buttons 541-543, the button 541 is for selecting the scan device application 125.

Because the scan device application 125 is to be purchased in the present example, the administrator presses the corresponding button 541. When the button 541 is pressed, the administrator terminal 30 transmits an application purchase request including an application ID of the scan device application 125 to the service providing apparatus 20 (S107).

Upon receiving the application purchase request from the administrator terminal 30, the setting registration part 221 of the service providing apparatus 20 registers the application ID included in the application purchase request in the corresponding organization record within the user information storage part 231. That is, the setting registration part 221 stores the application ID as an information item under "purchased application" of the organization record with the organization ID identifying the organization with which the login administrator is associated (S108). For example, in the user information storage part 231 illustrated in FIG. 8, "scan device application" included as information under the item "purchased application" of the organization record with the organization ID "123" is registered at this time (i.e., in step S108).

Next, the device communication part 222 obtains the scan device application 125, which corresponds to the device application identified by the application ID included in the application purchase request, from the device application storage part 233, and delivers the obtained scan device application 125 to the device 10 associated with the organization ID of the login administrator that has issued the application purchase request (S109). The device 10 associated with the organization ID of the login administrator refers to the device 10 that is registered in the device information storage part 232 in association with the organization ID of the organization to which the login administrator belongs.

Note that a firewall is typically implemented at the user environment E1 and the firewall may prevent the service providing apparatus 20 from delivering the scan device application 125 to the one or more devices 10 within the user environment E1. Accordingly, in certain embodiments, the service providing apparatus 20 may transmit the scan device application 125 to the device 10 in response to a polling request from the communication part 123 of the device 10.

The device 10 may retain information such as the IP address of the service providing apparatus 20 and a port number of the device communication part 222, for example, so that the device 10 may cooperate with the service providing apparatus 20. For example, the communication part 123 of the device 10 may conduct polling by periodically sending inquiries to the IP address and the port number to check whether some event has occurred. The inquiry may include the device number of the device 10, for example. If the device number designated in the inquiry corresponds to the device number of the device 10 associated with the organization ID of the login administrator that has issued the application purchase request for the scan device application 125, the device communication part 222 of the service providing apparatus 20 transmits the scan device application 125 to the device 10 in response to its inquiry.

Note that in a case where no firewall is implemented between the user environment E1 and the service providing apparatus 20, the device communication part 222 may simply transmit the scan device application 125 to the one or more devices 10 within the user environment E1. In this case, the IP address and the port number of the one or more devices 10 may be included in the device information stored in the device information storage part 232.

Upon receiving the scan device application 125 from the communication part 222, the one or more devices 10 install the received scan device application 125 (S110).

Next, when the administrator presses a return button 544 of the marketplace screen 540 that is displayed at the administrator terminal 30, the marketplace screen 540 is hidden and the administrator portal screen 530 is displayed at the administrator terminal 30.

Next, the administrator presses the cooperation button 531 of the administrator portal screen 530 to register account information of the online storage that is to be used in cooperation with the ScanToStorage service. When the cooperation button 531 is pressed by the administrator, the administrator terminal 30 displays a storage cooperation screen 610 (e.g., FIG. 11).

Figure 11:
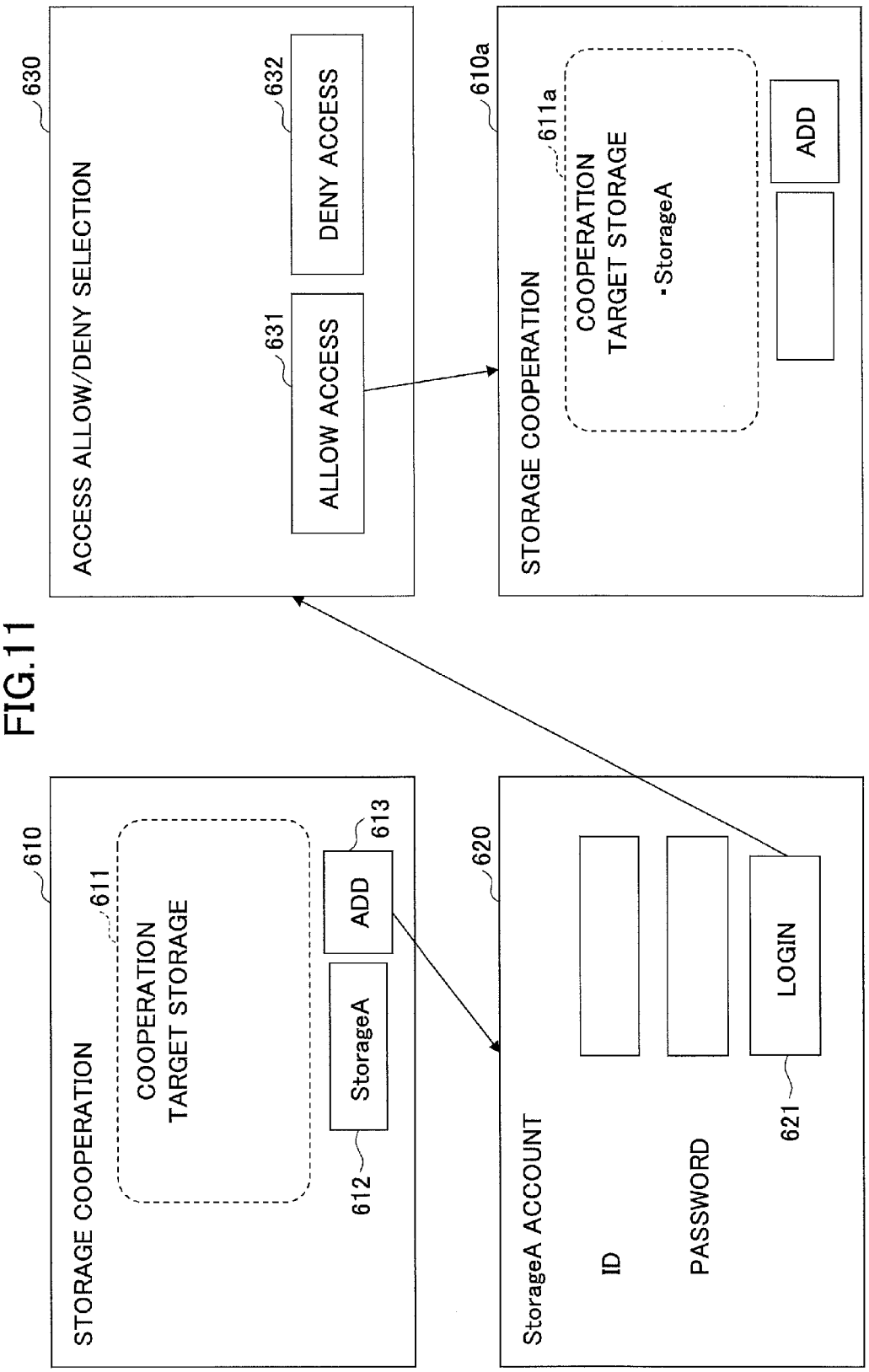
FIG. 11 illustrates exemplary screens for registering account information of a cooperation target storage.

FIG. 11 illustrates exemplary screens for registering account information of a storage service that is to cooperate with the ScanToStorage service.

In FIG. 11, the storage cooperation screen 610 includes a cooperation target storage display area 611, a cooperation target input area 612, and an add button 613. The cooperation target storage display area 611 displays the name of an online storage that has been designated as a cooperation target storage (referred to as "storage name" hereinafter). If one or more online storages have already been designated as cooperation target storages, the storage names of the designated online storages are displayed at the cooperation target storage display area 611. The cooperation target input area 612 is for inputting the storage name of an online storage to be designated as a cooperation target (referred to as "cooperation target storage" hereinafter).

When the administrator inputs a storage name ("Storage A") in the cooperation destination input area 612 and presses the add button 613, the administrator terminal 30 displays an account input screen 620. The administrator terminal 30 accepts, via the cooperation destination input screen 620, an input of account information of the cooperation target storage (e.g., an ID such as an email address and a password) from the administrator. The account information may be generated beforehand during a user registration process for registering as a user of the cooperation target storage, for example. When the ID and password are input to the account input screen 610 and a login button 621 is pressed, the administrator terminal 30 logs into the cooperation target storage ("Storage A") based on the input ID and password. In certain embodiments, a URL (Uniform Resource Locator) of a login request destination for the cooperation target storage may be stored in the administrator terminal 30 in association with the storage name. Alternatively, the URL may be input via the cooperation target input area 612.

If the login operation is successful, the administrator terminal 30 displays an access allow/deny selection screen 630. The access allow/deny selection screen 630 enables the administrator to select whether to allow or deny the service providing apparatus 20 access to the cooperation target storage. If a button 632 ("deny access") is pressed, the display screen of the administrator terminal 30 switches back to the administrator portal screen 530. If a button 631 ("allow access") is pressed, the administrator terminal 30 transmits an account registration request for registering the cooperation target storage to the service providing apparatus 20 (S111). The account registration request may include the storage name input to the storage cooperation screen 610, and the account information (e.g., ID and password) input to the account input screen 620.

Upon receiving the account registration request from the administrator terminal 30, the setting registration part 221 of the service providing apparatus 20 registers the storage name, ID, and password included in the account registration request as storage account information of the organization record with the organization ID of the login administrator stored in the user information storage part 231 (S112). For example, in FIG. 8, the storage name "Storage A," and the ID and password used in connection with Storage A are registered in the organization record for the organization with the organization ID "123."

In certain embodiments, the cooperation target storage and the account information of the cooperation target storage may be registered for each member user. In this case, the storage cooperation screen 610 or the account input screen 620 may include an input area for inputting one or more user names, for example. The one or more user names input to such input area may be included in the account registration request that is transmitted to the service providing apparatus 20. In turn, the setting registration part 221 of the service providing apparatus 20 may register the storage name, ID, and password included in the account registration request as account information of the member record for the member user identified by the user name included in the account registration request.

If the registration process based on the account registration request is successfully performed at the service providing apparatus 20, the administrator terminal 30 may display a storage cooperation screen 610*a* as illustrated in FIG. 11, for example. The storage cooperation screen 610*a* includes a cooperation target storage display area 611*a* that displays the storage name ("Storage A") of the cooperation target storage that has been successfully registered in the service providing apparatus 20. Note that account information of another online storage may be registered after the above registration process, for example. That is, account information of a plurality of online storages may be registered in association with one organization record or one member user record.

Next, the administrator registers one or more member users within the user environment E1 that are allowed to use the ScanToStorage service. Specifically, in the administrator portal screen 530 illustrated in FIG. 7, the administrator inputs the file name of a file describing information relating to such member users (referred to as "user information" hereinafter) in a textbox 535 included in the user registration area 535 and presses a register button 535*b*.

User information of one member user may include information items such as a user name, a password, and a card ID. Values representing such information items may be described in a user information file according to a certain format such as that illustrated in FIG. 12, for example.

FIG. 12 illustrates an exemplary manner of describing user information within a user information file. In the example illustrated in FIG. 12, the CSV format, which separates values representing various information items by commas, is used to describe the user information. However, the format used to describe the user information within the user information file is not limited to the CSV format but may be any other suitable format such as the XML format.

Referring back to FIGS. 6 and 7, when the file name of the user information file is input to the textbox 535*t* and the register button 535*b* is pressed by the administrator, the administrator terminal 30 transmits a user registration request including the user information described in the user information file to the service providing apparatus 20 (S113).

Upon receiving the user registration request from the administrator terminal 30, the setting registration part 221 of the service providing apparatus 20 registers the user information included in the user registration request in the user information storage part 231 in association with the organization ID of the organization to which the login administrator belongs (S114). Specifically, a new user record is generated for each set of user information, and each user record has one set of user information registered therein. For example, in FIG. 8, a user record may be generated and registered for each of user names B, C, and D in step S114. In certain embodiments, user information relating to the administrator may be included in the user registration request. User information relating to the administrator refers to user information relating to the user name included in the administrator record. In this case, the administrator record may be updated based on the user information relating to the administrator that is included in the user registration request. For example, the card ID of the administrator may be registered in the administrator record at this time (in step S114).

Next, the administrator may perform editing operations and/or setting operations on a profile that includes configuration information of an operation screen to be displayed at the operation panel 15 of the device 10 upon using the ScanToStorage service. In the present embodiment, the profile includes configuration information of an operation screen of the scan device application 125. The profile may include information relating to the layout of buttons on the operation screen, and information relating to the individual buttons such as scanning conditions, processes to be performed on scanned image data, and a storage destination (transmission destination) of scanned image data, for example.

Figure 13:
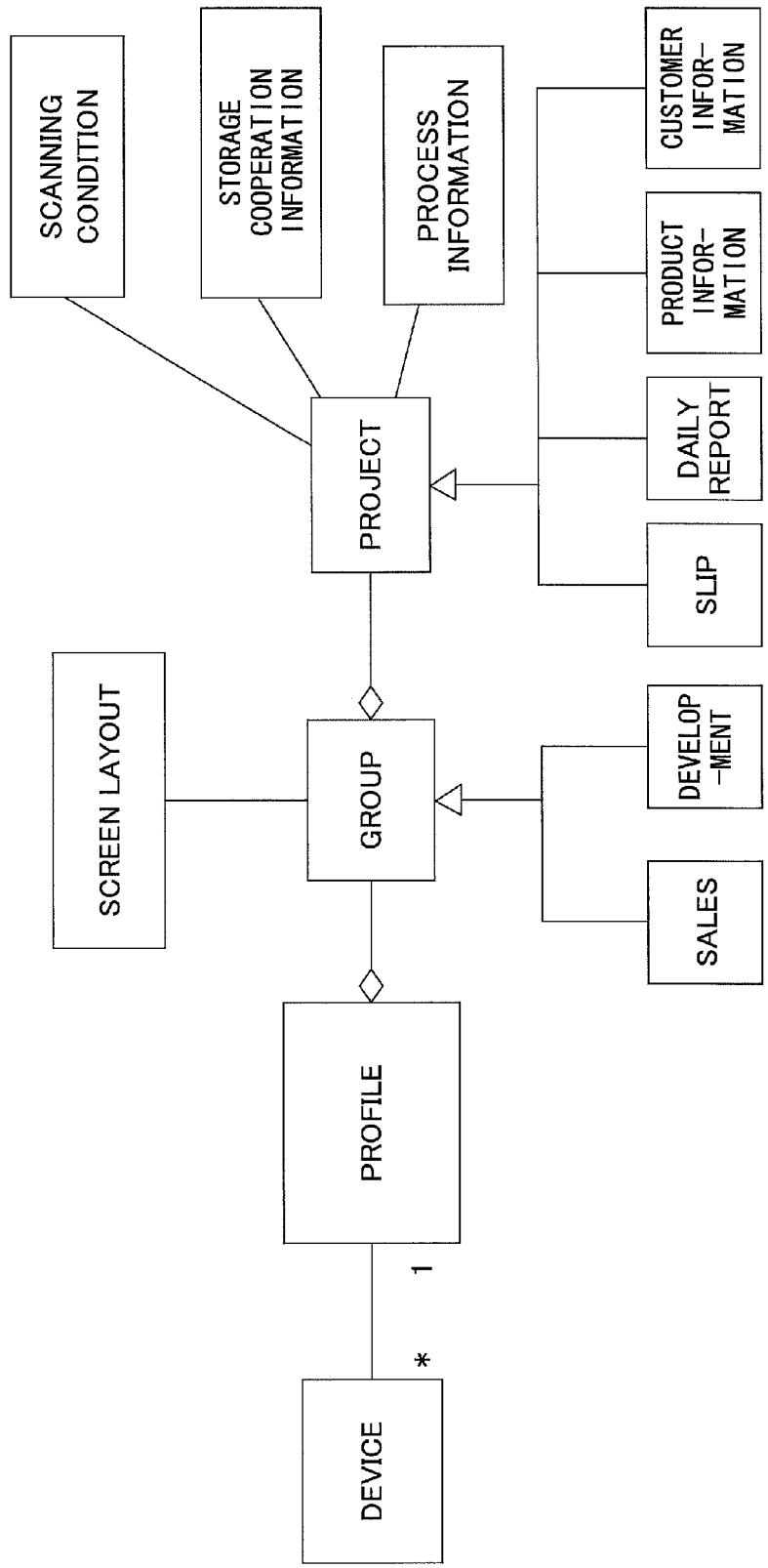
FIG. 13 illustrates a conceptual model of a profile.

FIG. 13 illustrates a conceptual model of a profile. In FIG. 13, each device 10 has one profile. In certain embodiments, a different profile may be set up for each individual device 10, or a different profile may be set up for each user with respect to one device 10.

The profile includes at least one group. A group may be a concept associated with a tab window within an operation screen, for example. In FIG. 13, "sales" and "development"

are illustrated as specific examples of groups. These groups represent a sales tab window and a development tab window, respectively.

One group includes at least one project and at least one set of screen layout information. A project may be a concept associated with an operation component such as a button arranged on a tab window, for example. In FIG. 13, "slip," "daily report," "product information," and "customer information" are illustrated as specific examples of projects. The projects may represent the labels on buttons arranged at the sales tab window, for example.

The screen layout information may include information on the layout and size of operation components (buttons) arranged within a tab window, for example.

One project may include or be associated with scanning condition information, storage cooperation information, and process information, for example. The scanning condition information includes information on scanning conditions for scanning image data. The storage cooperation information may include information indicating which folder of which online storage is to be the storage destination for the scanned image data, for example. The process information may include information on a process to be performed on the scanned image data before storing the image data, for example.

Referring to FIG. 7, when the profile setting button 533 of the administrator portal screen 530 is pressed, the administrator terminal 30 displays a profile setting screen 550. As illustrated in FIG. 7, the profile setting screen 550 includes a profile edit button 551 and a device setting button 552. When the profile edit button 551 is selected by the administrator, the administrator terminal 30 displays a profile edit screen 710 (e.g., FIG. 14) within the profile setting screen 550.

Figure 14:
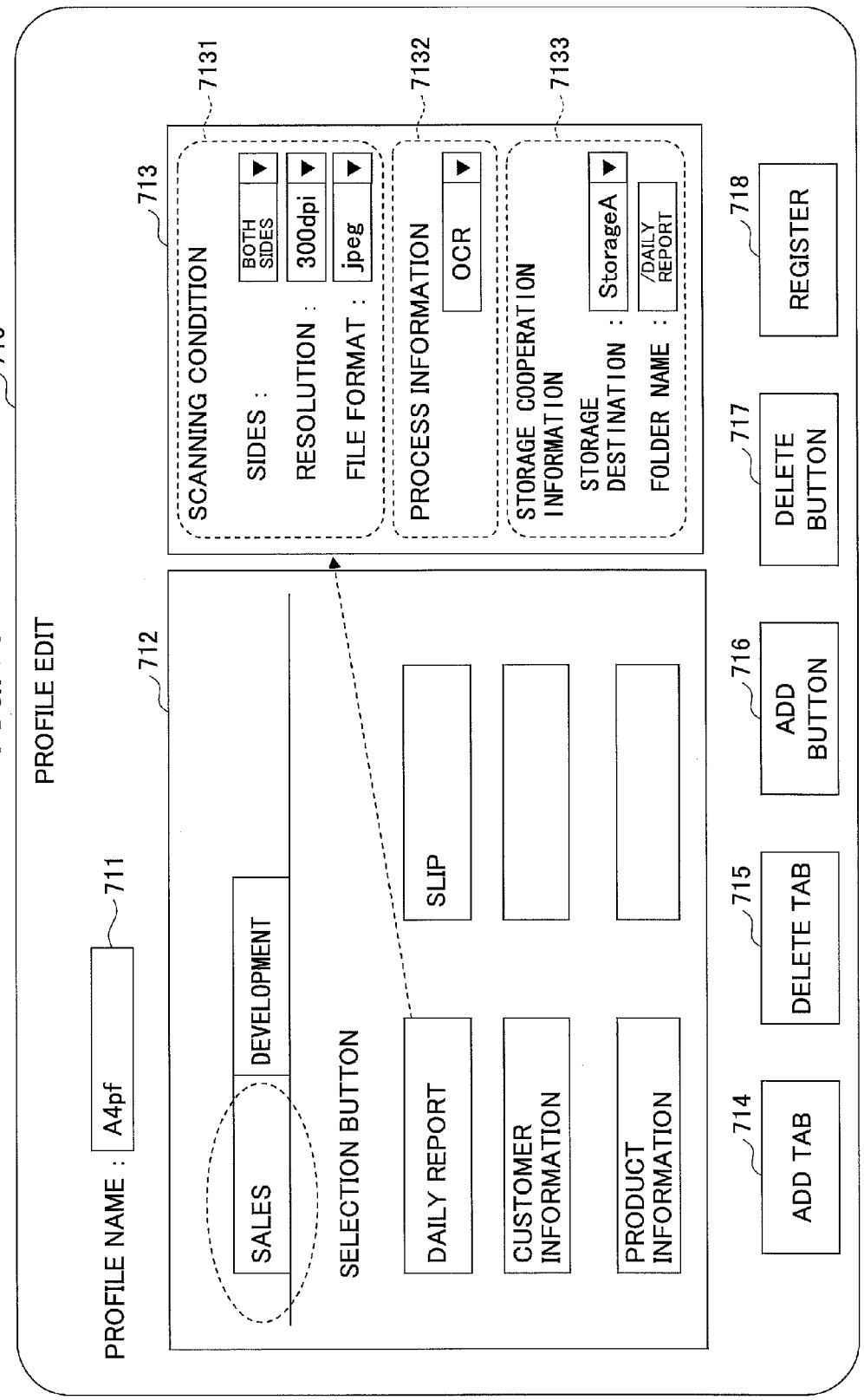
FIG. 14 illustrates an exemplary display of a profile edit screen.

FIG. 14 illustrates an exemplary display of the profile edit screen 710. In FIG. 14, the profile edit screen 710 includes a profile name input area 711, an edit target screen display area 712, a button edit area 713, edit buttons 714-717, and a register button 718.

The profile name input area 711 is for accepting an input of a profile name. The edit target screen display area 712 displays an operation screen that is subject to editing (operation screen of the scan device application 125). In FIG. 14, an exemplary screen corresponding to the conceptual model illustrated in FIG. 13 is displayed at the edit target screen display area 712. That is, the edit target screen displayed in FIG. 14 includes a sales tab window and a development tab window, with the sales tab window including a daily report button, a customer information button, a product information button, and a slip button.

The edit buttons 714-717 are buttons used for adding a new tab window, deleting a tab window that is subject to editing, adding a button to the tab window that is subject to editing, and deleting a selected button included in the tab window that is subject to editing.

Note that an initial screen displayed at the edit target screen display area 712 may be a screen having one tab window and one button arranged therein, for example. Alternatively, a screen based on a predetermined profile that is generated beforehand as a base pattern may be displayed as the initial screen.

A button selected at the edit target screen display area 712 (referred to as "target button" hereinafter) may be subject to deletion by the edit button 717 ("delete button") or editing at the button edit area 713. The button edit area 713 may include a scanning condition setting area 7131, a process information setting area 7132, and a storage cooperation information setting are 7133, for example.

The scanning condition setting area 7131 accepts settings of scanning conditions for a scanning operation to be executed when the target button is pressed. In FIG. 14, "sides," "resolution," and "file format" are illustrated as exemplary scanning conditions that may be specified. However, other scanning conditions such as color mode may be specified as well.

The process information setting area 7132 accepts a designation of a process to be executed on scanned image data when the target button is pressed. In FIG. 14, OCR (optical character recognition) is designated as the process to be executed on the scanned image data. In this case, data resulting from executing the OCR process on the scanned image data are to be stored. Note that other processes such as translation of the OCR-processed data or data format conversion of the image data may be designated as the process to be executed on the scanned image data. Also, a combination of two or more processes may be designated.

The storage cooperation information setting area 7133 accepts settings relating to a storage destination of scanned image data that has undergone the designated process. In FIG. 14, the storage name of the online storage corresponding to the storage destination and the folder name of a folder within the designated online storage are specified. The storage names that may be selected as the storage destination correspond to the storage names that are registered as account information in the organization record with the organization ID of the login administrator (see FIG. 8). Also, in the present embodiment, the folder name corresponds to the button name (label) of the target button. Thus, when the folder name is changed, the button name of the target button is changed accordingly. However, in other embodiments, the button name and the folder name do not necessarily have to be the same.

When editing and setting operations on the profile edit screen 710 are completed and the register button 718 is pressed, the administrator terminal 30 transmits a profile registration request including information on the edits and settings made via the profile edit screen 710 to the service providing apparatus 20 (S115 of FIG. 6). Upon receiving the profile registration request from the administrator terminal 30, the setting registration part 221 of the service providing apparatus 20 registers the information included in the profile registration request in the profile storage part 231 in association with the organization ID of the login administrator (S116 of FIG. 6).

FIG. 15 illustrates an exemplary configuration of the profile storage part 234. In FIG. 15, the profile storage part 234 stores, for every profile, information items such as "organization ID," "profile name," "group," and "project."

The organization ID identifies the organization to which the profile belongs. The profile name indicates the name of the profile. The group indicates one or more groups included in the profile. In the present example, a record for a profile includes a record for each group included in the profile (referred to as "group record" hereinafter). The project indicates one or more projects included in a group. In the present example, a record for a group includes a record for each project included in the group (referred to as "project record" hereinafter).

One group record includes a group name, layout information, and at least one project record. The group name identifies the group and is also used as the label of the tab for the tab window corresponding to the group. The layout information includes information on the layout of buttons included in the tab window corresponding to the group.

One project record includes a project name, scanning condition information, processing information, and storage cooperation information. The project name identifies the project and is also used as the label of the button corresponding to the project. In the present example, the project name corresponds to the folder name of the storage cooperation information. The scanning condition information, the processing information, and the storage cooperation information are described above in connection with the profile edit screen 710 of FIG. 14.

Next, when the device setting button 552 of the profile setting screen 550 illustrated in FIG. 7 is pressed by the administrator, the administrator terminal 30 displays a profile-device setting screen 720 as illustrated in FIG. 16, for example.

FIG. 16 illustrates an exemplary display of the profile-device setting screen 720. The profile-device setting screen 720 is for setting up the profile associated with each device 10. In FIG. 16, the profile-device setting screen 720 displays device information and a profile name input area 721 for each device 10 that has its device information registered in the device information storage part 232 in association with the organization ID of the login administrator. The administrator inputs the profile name of the profile to be associated with each device 10 (the profile to be used at each device 10) and presses a register button 722.

When the register button 722 is pressed, the administrator terminal 30 transmits a registration request including the information on the settings made via the profile-device setting screen 720 (e.g., device number and profile name combinations) to the service providing apparatus 20. Upon receiving the registration request from the administrator terminal 30, the setting registration part 221 of the service providing apparatus 20 registers the information included in the registration request in the profile-device correspondence storage part 235.

FIG. 17 illustrates an exemplary configuration of the profile-device correspondence storage part 235. In FIG. 17, the profile-device correspondence storage part 235 stores a device number, a profile name, and the application ID of a device application in association with each other. The application ID associated with a device corresponds to the application ID of the device application selected at the marketplace screen 540 of FIG. 7. That is, the setting registration part 221 stores the application ID of the selected device application in the memory device 203 in association with the login administrator, and upon receiving the registration request including the information on the settings made at the profile-device setting screen 720, the setting registration part 221 stores the application ID in the profile-device correspondence storage part 235 in association with the setting information.

Next, when a logout button 536 of the administrator portal screen 530 of FIG. 7 is pressed (S117 of FIG. 6), the administrator terminal 30 transmits a logout request to the service providing apparatus 20. Upon receiving the logout request from the administrator terminal 30, the service providing apparatus 20 cancels the login status of the login administrator.

By performing the above-described procedures, preparatory operations by the administrator for enabling use of the ScanToStorage service may be completed.

In the following, process steps that are executed within the information processing system 1 when the ScanToStorage service is used by a member user are described.

Figure 18:
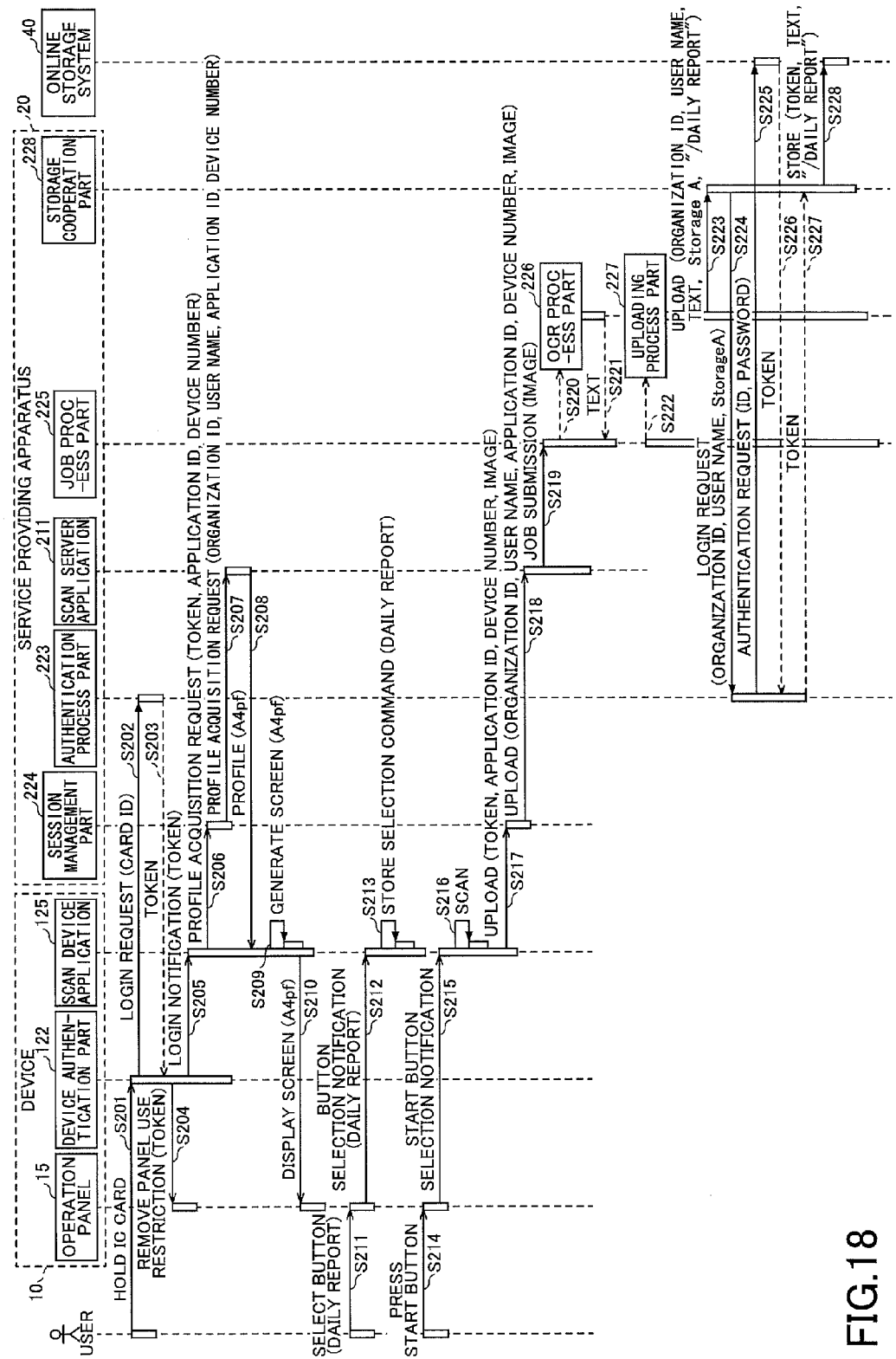
FIG. 18 is a sequence chart illustrating exemplary process steps that are executed upon using a ScanToStorage service according to the first embodiment.

FIG. 18 is a sequence chart illustrating exemplary process steps that are executed upon using the ScanToStorage service in the information processing system 1 according to the first embodiment. In the following descriptions, the device 10 that is operated is simply referred to as "device 10" and the member user operating the device us simply referred to as "user." Also, it is assumed that no user is logged into the device 10 at the time the process of FIG. 18 is started.

When the user holds his/her IC card against a card reader (not shown) of the device 10 to which the user wishes to login, the device authentication part 122 obtains the card ID of the IC card via the card reader (S201). Then, the device authentication part 122 transmits an authentication request including the card ID to the service providing apparatus 20 (S202).

Upon receiving the authentication request from the device 10, the authentication process part 223 of the service providing apparatus 20 authenticates the card ID included in the authentication request. For example, the authentication process part 223 may determine that authentication of the card ID is successful if a record including the card ID is stored in the user information storage part 231. In another example, the device 10 may transmit its organization ID and device number along with the card ID. In this case, the authentication process part 223 may determine that authentication is successful if there is no inconsistency in the combination of the organization ID, the device number, and the card ID. If the authentication is successful, the session management part 224 establishes a session between the device 10 and the service providing apparatus 20. The session management part 224 determines the organization ID and the user name that is stored in association with the card ID within the user information storage part 231 and stores the associated organization ID and user name in the memory device 203 in association with this session. Also, the session management part 224 generates a token (e.g., cookie) as identification information of this session. The authentication process part 223 includes this token in a response indicating successful authentication to the device authentication part 122 of the device 10 (S203).

Upon receiving the response indicating successful authentication, the device authentication part 122 stores the token included in this response in the RAM 112. Also, the device authentication part 122 removes the use restriction (lock) implemented on the operation panel 15 so that the user may be able to operate the device 10 (S204). When the user restriction is removed, the user may operate the device 10 via the operation panel 15.

Next, the device authentication part 122 notifies one or more applications running on the device 10 of the successful login operation. In the present embodiment, the scan device application 125 is one of the applications receiving notification of the successful login operation (S205). The token is included in the successful login notification. Thus, the scan device application 125 acquires the token via this login notification.

Next, when the scan device application 125 is selected for use by the user through operation of the operation panel 15, the scan device application 125 designates its application ID, the acquired token, and the device number of the device 10 in a profile acquisition request, and sends this profile acquisition request to the scan server application 211 of the service providing apparatus 20 (S206). The session management part 224 of the service providing apparatus 20 relays this profile acquisition request to the scan server application 211. Upon relaying the profile acquisition request, the session management part 224 converts the token included in the profile acquisition request into the organization ID and user name associated with the session identified by the token and forwards the profile acquisition request to the scan server application 211 (S207). Further, the session management part 224 is configured to reject a profile acquisition request that includes an illegitimate token.

Next, the scan server application 211 refers to the profile-device correspondence storage part 235 (FIG. 17) to determine the profile name associated with the application ID and device number designated in the profile acquisition request. Further, the scan server application 211 acquires from the profile storage part 234 (FIG. 15) the corresponding profile identified by the determined profile name and the organization ID converted from the token. Then, the scan server application 211 transmits the acquired profile to the scan device application 125 (S208).

Based on the profile received from the scan server application 211, the scan device application 125 generates an operation screen (S209). Then, the scan device application 125 prompts the operation panel 15 to display the generated operation screen (S210). Note that strictly speaking, the generation of the operation screen based on the profile and the display of the operation panel is implemented by the display control part 124.

Figure 19:
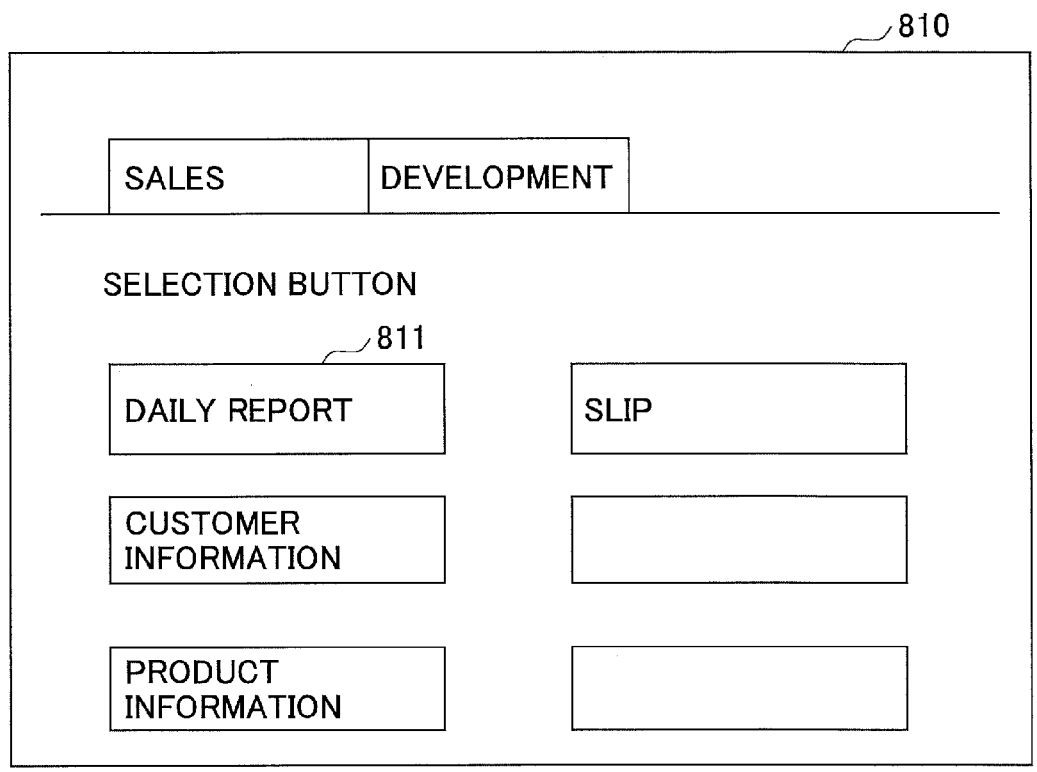
FIG. 19 illustrates an exemplary display of an operation screen of a scan device application.

FIG. 19 illustrates an exemplary display of an operation screen 810 of the scan device application 125. The operation screen 810 illustrated in FIG. 19 corresponds to the screen displayed at the edit target screen display area 712 of the profile edit screen 710 illustrated in FIG. 14.

Next, the user selects a desired button from selection buttons displayed at the operation screen 810 (S211). For example, if the user wishes to have a daily report scanned, the user may select a daily report button 811 from the operation screen 810. In turn, the operation panel 15 notifies the scan device application 125 of the button selected by the user (S212), and the scan device application 125 stores information items such as the group name, project name, scanning conditions, and storage cooperation information associated with the selected daily report button 811 in the RAM 112 (S213). The information items such as the scanning conditions and the storage cooperation information are included in the profile used for generating the operation screen 810.

Next, the user sets the daily report as a document to be scanned on the device 10 and presses a start button displayed on the operation panel 15 (S214). In turn, the operation panel 15 notifies the scan device application 125 that the start button has been selected (S215). In response to the notification of the selection of the start button, the scan device application 125 prompts the device 10 to execute the scan job on the document via the device control part 121 (S216). That is, the scanner 12 is prompted to read image data from the document. In this operation, the scanning conditions stored in the RAM 112 in step S213 are used. In this way, suitable scanning conditions for scanning a daily report may be used to scan the document and generate image data of the document.

Next, the scan device application 125 transmits (uploads) the image data along with its application ID, the device number of the device 10, the group name and project name of the selected button, and the token of the current session to the server scan application 211 (S217). The session management part 224 converts the token into the corresponding organization ID and user name, and forwards the organization ID and user name converted from the token, the application ID, the device number, the group name, the project name, and the image data to the scan server application 211 (S218).

The scan server application 211 determines the profile corresponding to the forwarded application ID and device number based on the profile-device correspondence storage part 235 and the profile storage part 234, and determines the process information and storage cooperation information associated with the forwarded group name and project name by referring to this profile.

The scan server application 211 submits a job execution request for executing a job describing a process to be executed based on the process information and the storage cooperation information (referred to as "job A" hereinafter) to the job process part 225 (S219). In the present example, it is assumed that the process information calls for the execution of an OCR process, and the storage cooperation information designates the folder "/daily report" of Storage A as the storage (uploading) destination. The job is associated with the scanned image data, the user name, and the organization ID of the device 10. The job execution request is stored in a job queue that is created within the RAM 112. In the present example, the job is not executed synchronously with the job execution request. However, in certain embodiments, the job may be executed synchronously with the submission of the job execution request.

Next, when the job process part 225 extracts the job A from the job queue, the job process part 225 requests the OCR process part 226 to execute an OCR process on the scanned image data based on the process information associated with the job A (S220). The OCR process part 226 executes the OCR process and outputs text data as the processing result (S221).

Next, the job process part 225 sends an uploading request to the uploading process part 227 to upload the text data, designating the storage name and folder name indicated by the storage cooperation information and the organization ID and the user name associated with the text data (S222). The uploading process part 227 requests the storage cooperation part 228 to execute a corresponding uploading process according to the uploading request (S223).

The storage cooperation part 228 sends a login request to the authentication process part 223 to log into the online storage system 40 corresponding to the designated storage name (S224). The storage cooperation part 228 designates in the login request the organization ID and storage name designated in the uploading request. The authentication process part 223 acquires the organization record with the organization ID designated in the uploading request from the user information storage part 231, and acquires the account information (ID and password) associated with the storage name designated in the uploading request from the storage account information of the acquired organization record. The authentication process part 223 may use the acquired account information to transmit an authentication request to the online storage system 40 of Storage A (simply referred to as "Storage A" hereinafter), for example (S225).

Storage A authenticates the account information included in the authentication request from the authentication process part 223, and transmits, upon successful authentication, a token for accessing Storage A to the authentication process part 223 (S226). The authentication process part 223 transmits the received token to the storage cooperation part 228 (S227).

Next, the storage cooperation part 228 transmits a storage request for storing the text data obtained by the OCR process to the online storage (Storage A) identified by the storage name designated in the uploading request, the storage request designating the token for accessing Storage A received from the authentication process part 223 (S228). The storage request also designates the folder name ("/daily report") that is designated in the uploading request as the storage destination folder.

In this way, the text data may be stored in the "/daily report" folder of Storage A.

As can be appreciated from the above, according to an aspect of the first embodiment, the device 10 may be configured to cooperate with the ScanToStorage service. Specifically, an operation screen of the ScanToStorage service is stored as a profile in the service providing apparatus 20. To use the ScanToStorage service, the device 10 obtains (downloads) the profile from the service providing apparatus 20 and prompts the operation panel 15 to display the operation screen based on the obtained profile. A process in response to an operation of the operation screen (e.g., button selection) is executed according to definitions included in the profile.

Thus, for example, by having multiple devices 10 within an organization associated with the same profile, a user may be able to receive the same service from any of the devices 10 within the organization. Alternatively, the profile associated with the device 10 may vary depending on the department or group at which the device 10 is used, for example. In this way, a user may receive the ScanToStorage service in a suitable mode according to the business operations of each group or department within the organization, for example.

In certain embodiments, a similar service may be provided with respect to image data stored in a storage device within the user environment E1, for example. Also, the storage destination of the image data is not limited to an online storage, but may alternatively be some other storage location such as a folder within the auxiliary storage device 202 of the service providing apparatus 20, for example.

In the following a second embodiment of the present invention is described. Note that features of the second embodiment that differ from those of the first embodiment are described below. On the other hand, features that are not particularly mentioned below may be identical to those of the first embodiment.

Figure 20:
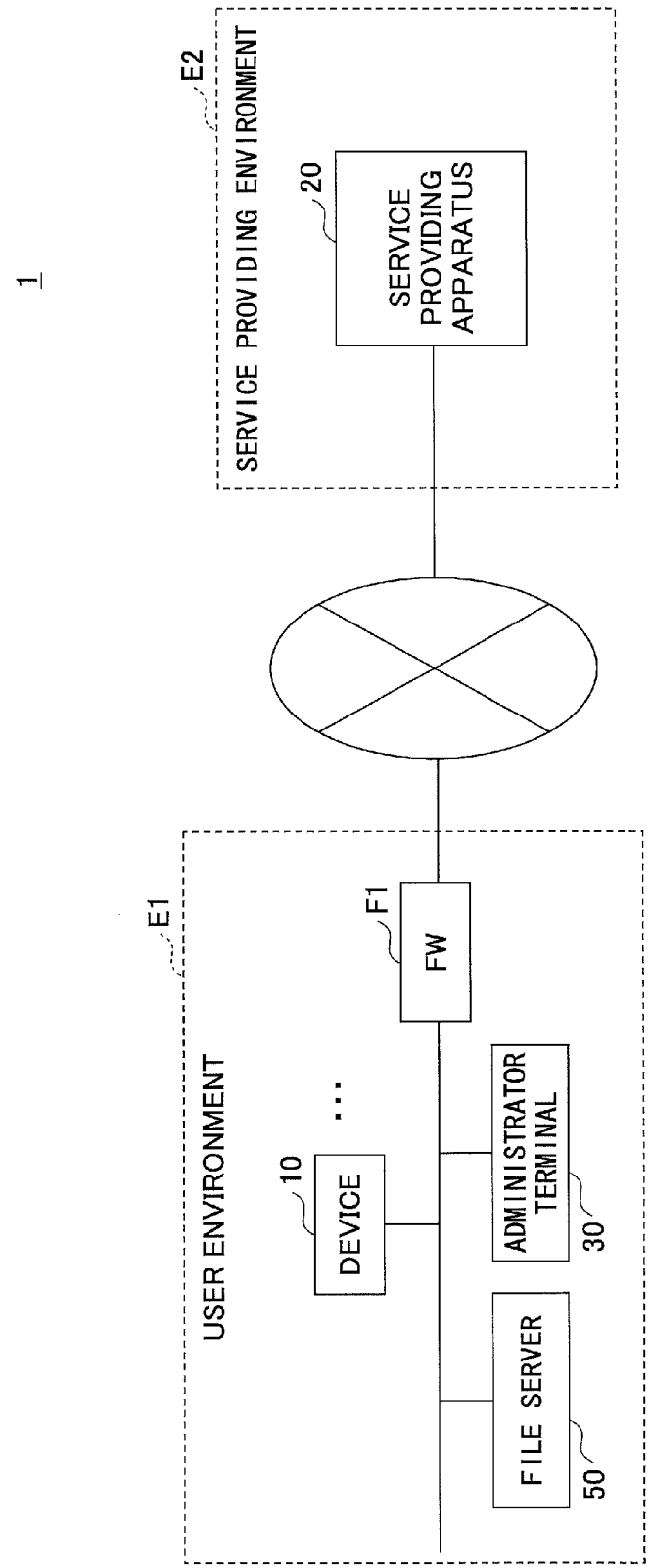
FIG. 20 illustrates an exemplary configuration of an information processing system according to a second embodiment of the present invention.

FIG. 20 illustrates an exemplary configuration of an information processing system 1 according to the second embodiment. Note that components illustrated in FIG. 20 that are identical to those illustrated in FIG. 1 are given the same reference numerals and their descriptions are omitted.

In FIG. 20, the user environment E1 includes a file server 50. In the second embodiment, the file server 50 corresponds to the storage destination of the image data scanned using the ScanToStorage service. The file server 50 may be a computer that is accessible using a communication protocol such as SMB (Server Message Block) or FTP (File Transfer Protocol), for example.

That is, in the second embodiment, a device that is provided within the local environment as viewed from the device 10 is used as the storage destination of image data. A local environment refers to a network environment within the firewall F1 of the user environment E1. Note that although the online storage system 40 is not illustrated in FIG. 20, the second embodiment does not necessarily exclude the use of the online storage system 40. For example, in certain embodiments, the first embodiment may be implemented in conjunction with the second embodiment. In the following descriptions, a storage destination for image data that is provided within a local environment is referred to as "local storage."

In the first embodiment, image data scanned by the device 10 is transmitted from the device 10 to the service providing apparatus 20 after which the image data is transmitted from the service providing apparatus 20 to the online storage system 40 (see, e.g., steps S223-S228 of FIG. 18). The online storage 40 expects to receive a request from the exterior. Thus, the online storage system 40 is able to receive image data transmitted from the service providing apparatus 20.

On the other hand, the user environment E1 includes the firewall F1. Thus, if the file server 50 is simply used in place of the online storage system 40 and the process steps of the first embodiment are executed, image data transmitted from the service providing apparatus 20 to the file server 50 will be blocked by the firewall F1. That is, the process steps of the first embodiment may not be conducive to storing image data using the ScanToStorage service in a case where the file server 50 corresponds to the storage destination of the image data.

Accordingly, the second embodiment relates to a case in which the file server 50 is used as the storage destination for the ScanToStorage service.

In the second embodiment, the screens for registering account information of the cooperation target storage (storage destination) illustrated in FIG. 11 are further extended in the manner described below.

Figure 21:
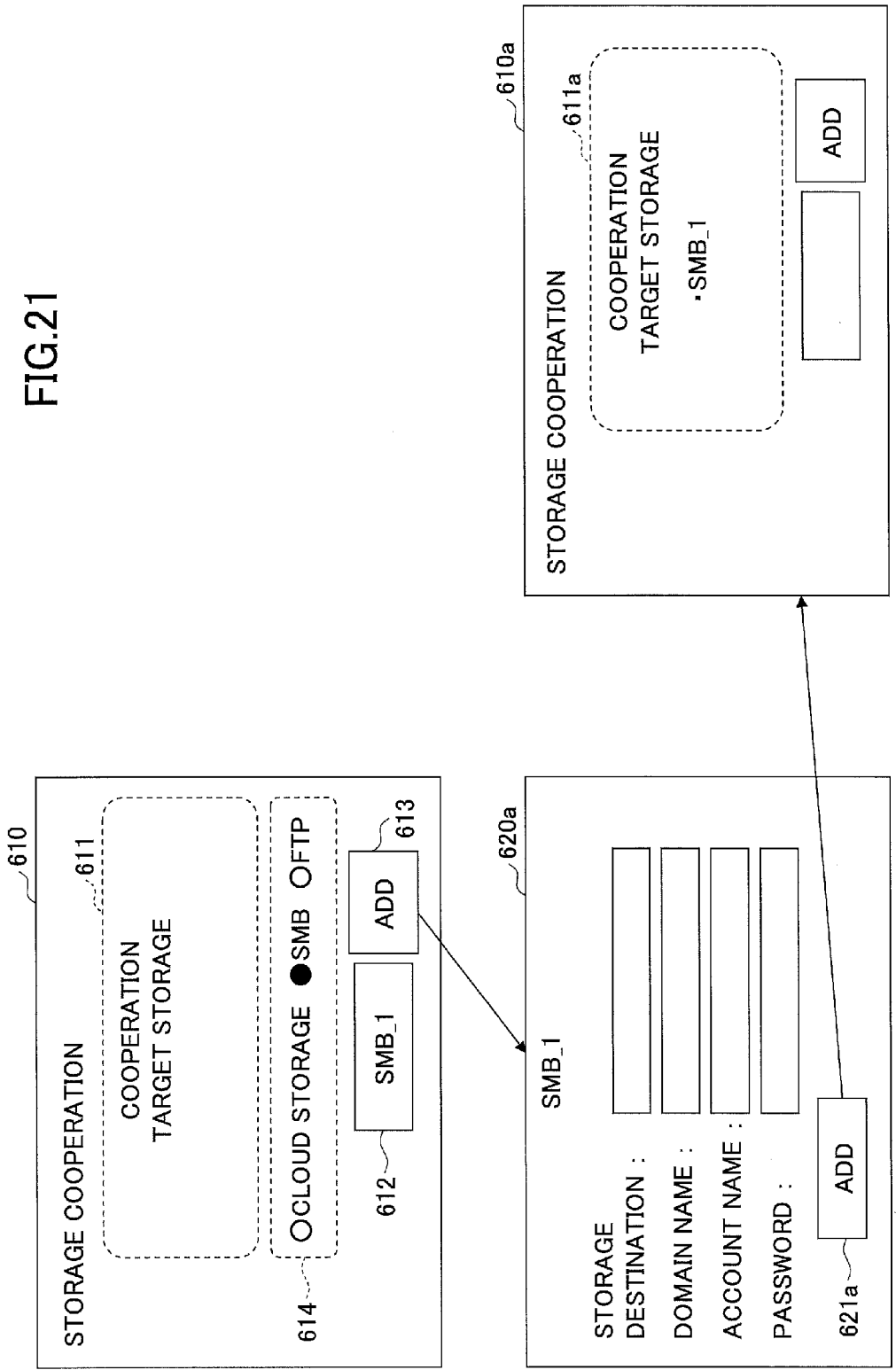
FIG. 21 illustrates exemplary screens for registering account information of a cooperation target storage according to the second embodiment.

FIG. 21 illustrates exemplary screens for registering account information of the cooperation target storage according to the second embodiment. Note that in FIG. 21, elements that are identical to those illustrated in FIG. 11 are given the same reference numerals and their descriptions are omitted.

In FIG. 21, the storage cooperation screen 610 includes a storage type selection area 614. The storage type selection area 614 is for enabling selection of the type of the storage that is to be the cooperation target via radio buttons, for example. In the illustrated example, "cloud storage," "SMB," and "FTP" are indicated as storage type options. The online storage system 40 may be classified under "cloud storage." That is, "cloud storage" represents a storage provided outside the user environment E1. "SMB" represents a local storage that may be accessed using SMB. "FTP" represents a local storage that may be accessed using FTP. The file server 50 may be classified under either "SMB" or "FTP."

When "cloud storage" is selected by the administrator as the storage type of the cooperation target storage, the process steps of the first embodiment may be executed. On the other hand, for example, when "SMB" is selected by the administrator as the storage type and a storage name (e.g., "SMB_1") is input to the cooperation target input area 612 after which the add button 613 is pressed, the administrator terminal 30 displays an SMB account input screen 620a as illustrated in FIG. 21.

The SMB account input screen 620a accepts inputs of a storage destination, a domain name, an account name, and a password. The storage destination corresponds to identification information of the local storage to be accessed using SMB. The identification information may be a host name, an IP address, or any type of information that enables identification of the storage destination under SMB. The domain name, account name, and password correspond to required account information for accessing the local storage. When "FTP" is selected by the administrator as the storage type, an FTP account input screen may be displayed instead of the SMB account input screen 620a. The FTP account information input screen may be configured to accept an IP address of the local storage to be accessed using FTP and required account information for accessing the local storage.

When an IP address, a domain name, an account name, and a password are input to the SMB account input screen 620a, and an add button 621a is pressed, the administrator terminal 30 transmits the an account registration request for registering the cooperation target storage to the service providing apparatus 20 (see, e.g., step S111 of FIG. 6). The account registration request includes the storage name input to the storage cooperation screen 610 and the account information input to the SMB account input screen 620a (IP address, domain name, account name, password, etc.).

Upon receiving the account registration request, the setting registration part 221 of the service providing apparatus 20 registers the storage name, the IP address, the domain name, the account name, and the password included in the account registration request as storage account information of the organization record that is stored in association with the organization ID of the login administrator within the user information storage part 231 (see, e.g., S112 of FIG. 6).

FIG. 22 illustrates an example in which storage account information of a local storage is stored in the user information storage part 231 according to the second embodiment.

In the example illustrated in FIG. 22, account information of the local storage "SB_1" is registered in the second line of the storage account information of the organization record for the organization identified by the organization ID "123."

When account information of the local storage "SMB_1" is registered in addition to the account information of Storage A as a cooperation target storage as in the illustrated example of FIG. 22, the local storage "SMB_1" may be selected as a storage destination at the storage cooperation information setting area 7133 of the profile edit screen 710 illustrated in FIG. 14, for example. It is assumed in the present example that "SMB_1" corresponds to the storage name of the file server 50. Also, at the storage cooperation information setting screen 7133, a folder name within the file server 50 may be designated. As in the first embodiment, the folder name may correspond to the project name defined in the profile. In this case, the profile storage part 234 may store a profile as illustrated in FIG. 23, for example.

FIG. 23 illustrates an exemplary manner in which a profile is stored in the profile storage part 234 according to the second embodiment.

In the example illustrated in FIG. 23, the storage name "SMB_1" of the file server 50 and the folder name "/customer information" within the file server 50 are registered as storage cooperation information of the project record for "customer information."

In certain embodiments, account information of a storage to be used as the storage destination for a project may be registered with respect to each project, for example. In this case, the storage cooperation information setting area 7133 of the profile edit screen 710 may include an account information input area. Also, the storage cooperation information registered in the project record within the profile storage part 234 may include account information (e.g., domain name, account name, and password) in addition to the storage name and folder name of the storage destination.

In the following, process steps that are executed upon using the ScanToStorage service are described.

Figure 24:
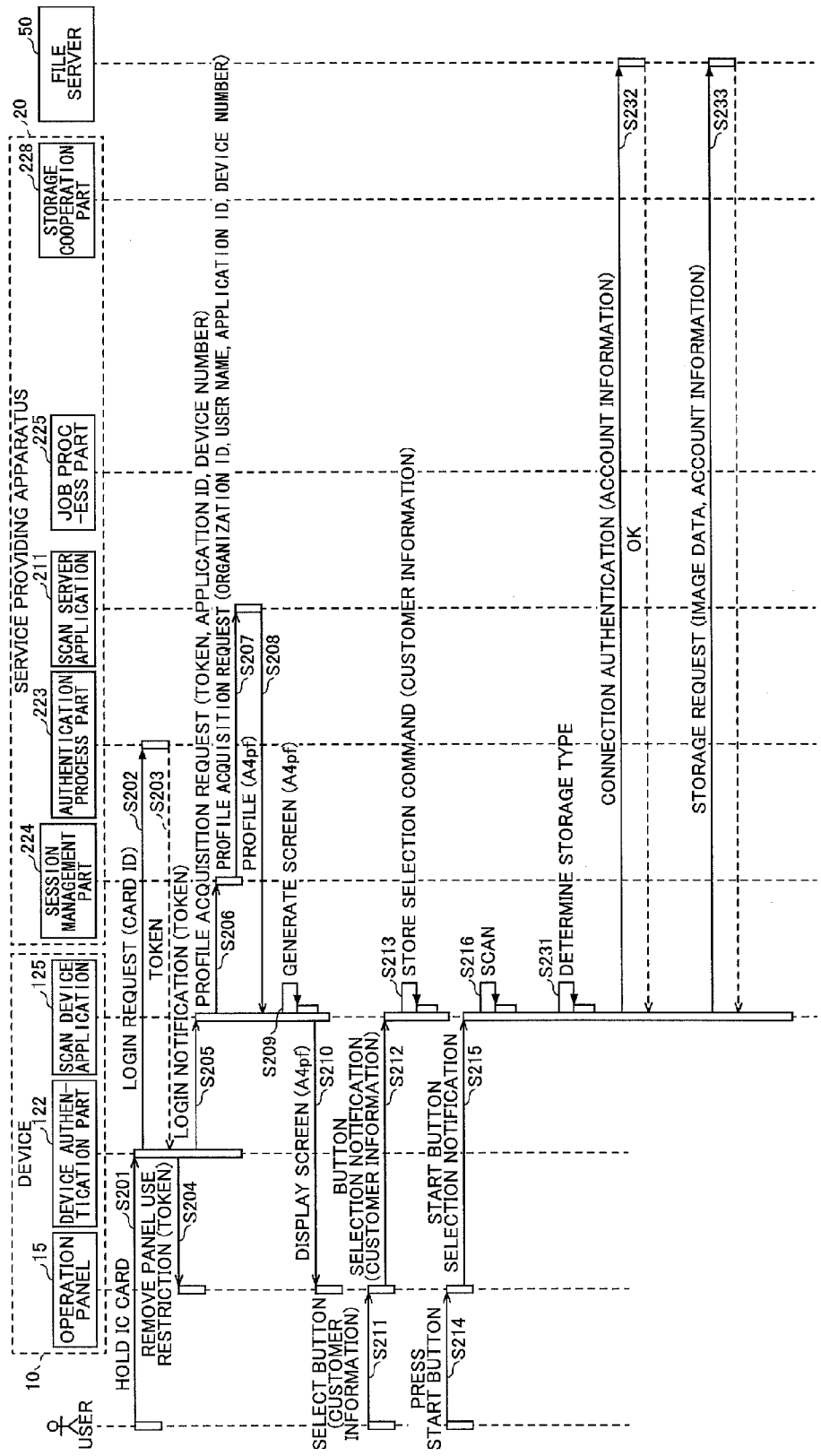
FIG. 24 is a sequence chart illustrating exemplary process steps that are executed upon using the ScanToStorage service according to the second embodiment.

FIG. 24 is a sequence chart illustrating exemplary process steps executed upon using the ScanToStorage service according to the second embodiment. Note that process steps illustrated in FIG. 24 that are identical to those illustrated in FIG. 18 are given the same reference numerals and their descriptions are omitted.

In the example illustrated in FIG. 24, in step S211, a selection button corresponding to the project "customer information" is selected (pressed) at the operation screen 810 displayed at the operation panel 15. It is assumed that the project record for the project "customer information" has "SMB_1" (file server 50) registered as its storage cooperation information as illustrated in FIG. 23. Accordingly, in step S213, the scan device application 125 stores the group name, project name, scanning conditions, and storage cooperation information corresponding to the selected button in the RAM 112.

Next, when the user sets a document including customer information on the device as a document to be scanned and selects (presses) a start button on the operation panel 15 (S214), the operation panel 15 notifies the scan device application 125 of the selection of the start button (S215). Upon receiving the start button selection notification, the scan device application 125 prompts the device 10 to execute the scan job on the document via the device control part 121 (S216). That is, the scan device application 125 prompts the scanner 12 to scan image data from the document. In this scanning operation, the scanning conditions stored in the RAM 112 in step S213 are used. Thus, scanning conditions suitable for scanning the customer information may be used to scan the document and generate image data therefrom.

Next, the scan device application 125 determines the storage type of the storage destination for the image data based on the storage cooperation information stored in the RAM 112 in step S213 (S231). For example, if the configuration of the storage cooperation information differs depending on the storage type, the scan device application 125 may determine the storage type (e.g., cloud storage, SMB, or FTP) of the storage destination for the image data based on the configuration information of the storage cooperation information stored in the RAM 112. Alternatively, in a case where the storage type cannot be determined simply based on the configuration of the storage cooperation information, for example, a character string indicating the storage type may be registered in the storage cooperation information. Specifically, the storage type may be registered in the storage account information of the user information storage part 231, and the storage type may be passed on to be stored as the storage cooperation information of the profile storage part 234. The value to be registered as the storage type in the storage account information of the user information storage part 231 may be determined based on the selection made at the storage type selection area 614 of the storage cooperation screen 610 illustrated in FIG. 21, for example.

In the case where the storage type is determined to be "cloud storage," the process steps from S217 and onward illustrated in FIG. 18 may be executed.

In the case where the storage type is determined to be a local storage such as "SMB" or "FTP," the scan device application 125 performs connection confirmation with respect to the local storage that is identified as the cooperation target by the storage cooperation information stored in the RAM 112 in step S213 (S232). In the present example, the connection confirmation is executed with respect to the file server 50. The connection confirmation may involve confirming whether the local storage can be accessed (e.g., whether login connection may be established) using the account information (e.g., domain name, account name, and password) included in the storage cooperation information, for example.

Upon confirming that connection can be established (e.g., login access is allowed), the scan device application 125 transmits the image data scanned from the document to a folder of the file server 50 corresponding to the folder name included in the storage cooperation information (S233). In this operation, the account information (e.g., domain name, account name, and password) may be retransmitted to the file server 50 as is necessary. Also, in certain embodiments, the image data may be transmitted in conjunction with the connection confirmation process. That is, steps S232 and S233 may be executed at the same time.

From a security perspective, certain users may prefer not to have the service providing apparatus 20 manage the account information including a password because the service providing apparatus 20 is located outside the user environment E1. Accordingly, in certain embodiments, the SMB account input screen 620a of FIG. 21 may omit the field for inputting a password. In this case, the password will not be stored in the storage account information of the user information storage part 234 (see FIG. 22) and the storage cooperation information of the profile storage part 234 (see FIG. 23). Thus, for example, upon receiving a start button notification in step S215 of FIG. 24, the scan device application 125 may prompt the operation panel 15 to display a password input screen so that the user may input the password via such password input screen. In one embodiment, the input password may be stored (cached) in the HDD 114 of the device 10 in association with the account information such as the domain name and the account name, for example. Once the password is cached in this manner, the password input screen does not have to be displayed upon subsequently executing the process steps of FIG. 24. That is, the password cached in association with the domain name and account name included in the storage cooperation information stored in the RAM 112 in step S213 may be used to execute steps S232 and S233 of FIG. 24.

As can be appreciated from the above, according to an aspect of the second embodiment, when the storage destination for storing image data corresponds to a local storage, the device 10 may transmit the image data directly to the local storage. That is, the image data is not transmitted and stored via the service providing apparatus 20. Thus, even when the firewall F1 is provided within the user environment E1, the image data may be reliably transmitted to the local storage and stored therein. Also, from the perspective of the user, operations for storing image data in the local storage (file server 50) may be substantially identical to operations for storing image data in the online storage system 40.

Also, even in a case where the firewall F1 is not provided within the user environment E1 so that the service providing apparatus 20 is able to access the local storage, by arranging the device 10 to transmit the image data directly to the local storage as in the present embodiment, the processing time required for storing the image data may be reduced compared to a case where the image data is relayed by the service providing apparatus 20. Further, in a case where the local storage is frequently used to store image data, by implementing the present embodiment, the network load on the service providing apparatus 20 may be prevented from increasing.

In the following, a third embodiment of the present invention is described. The third embodiment is an exemplary modification of the second embodiment, and only features of the third embodiment that differ from those of the second embodiment are described below. That is, features that are not particularly mentioned below may be assumed to be identical to the second embodiment.

In the second embodiment, at the SMB account input screen 620a of FIG. 21, the user has to manually input identification information (e.g., IP address) of the cooperation target local storage one character at a time. In this case, the user has to check the identification information such as the IP address of the cooperation target local storage beforehand to be able to accurately input the information. Such a user interface may not be considered very user-friendly. For example, user-friendliness may be improved if list information of devices that may be selected as the storage destination were to be displayed at the user interface.

However, in the second embodiment, the SMB account input screen 620a is displayed as the user interface based on a webpage provided by the setting register part 221 of the service providing apparatus 20. In order to display list information of devices that may be selected as the storage destination, the setting register part 221 would have to execute a search for devices that are connected to a network within the user environment E1. However, such a search request would be blocked by the firewall F1. Thus, the setting register part 221 cannot obtain such list information of devices within the user environment E1.

In this respect, the third embodiment includes certain features for improving operability of the SMB account input screen 620a.

Figure 25:
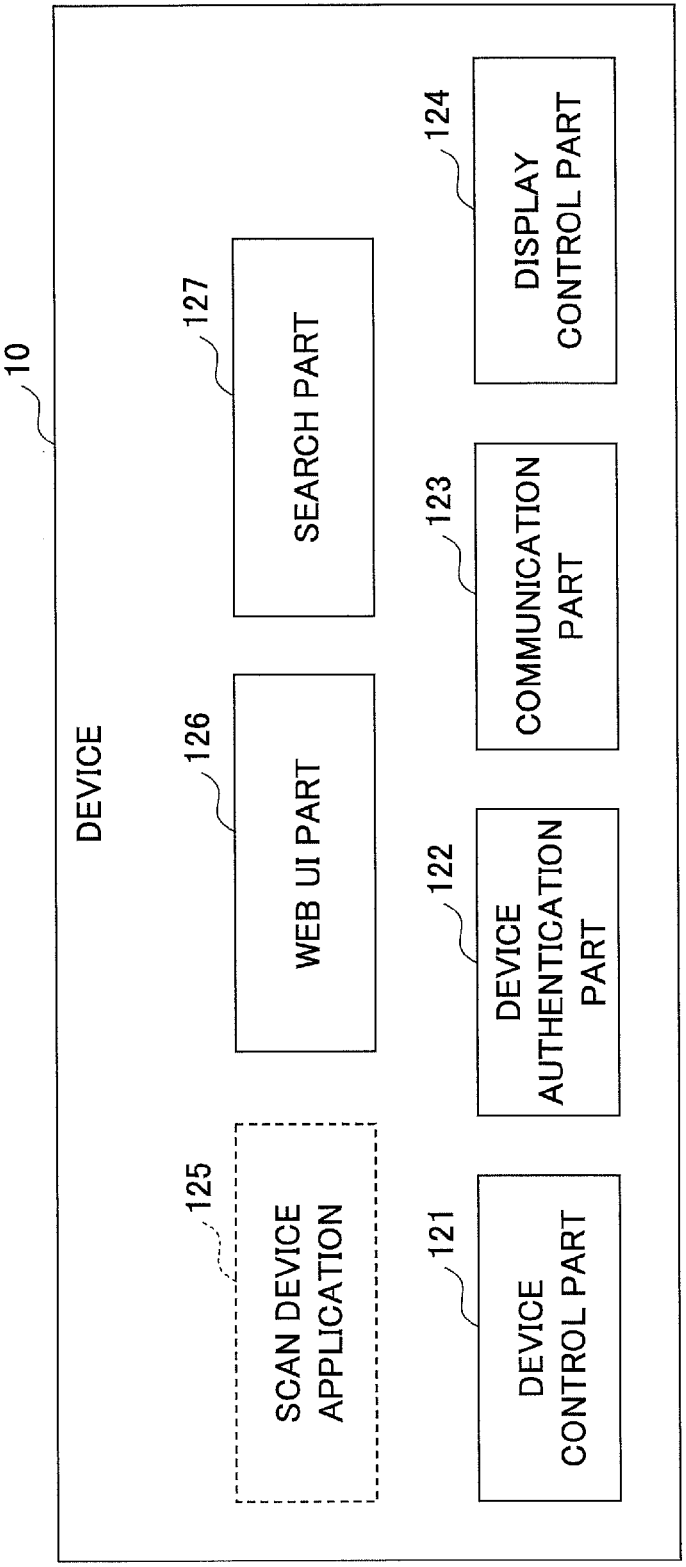
FIG. 25 illustrates an exemplary functional configuration of the device according to a third embodiment of the present invention.

FIG. 25 illustrates an exemplary functional configuration of the device 10 according to the third embodiment. In FIG. 25, the device 10 further includes a web UI part 126 and a search part 127. The web UI part 126 provides a user interface via a webpage through a network. In the present embodiment, the web UI part 126 provides a user interface via a webpage to the administrator terminal 30. The search part 127 searches for devices connected to the network within the user environment E1.

Also, in the third embodiment, the device information storage part 232 may have a configuration as illustrated in FIG. 26, for example.

FIG. 26 illustrates an exemplary configuration of the device information storage part 232 according to the third embodiment. In FIG. 26, each record of the device information storage part 232 further includes the information items "link destination URL" and "access token."

The link destination URL corresponds to the URL of the link to the web UI part 126 of the device 10. The access token corresponds to data for enabling the device to confirm the legitimacy of an access to the device 10. A value representing the link destination URL may be registered in steps S105 and S106 along with the other device information items that are registered. Accordingly, in certain embodiments, the link destination URL may be described in a device information file along with the other device information items. On the other hand, the access token may be registered in the device storage part 232 in the manner described below, for example.

Figure 27:
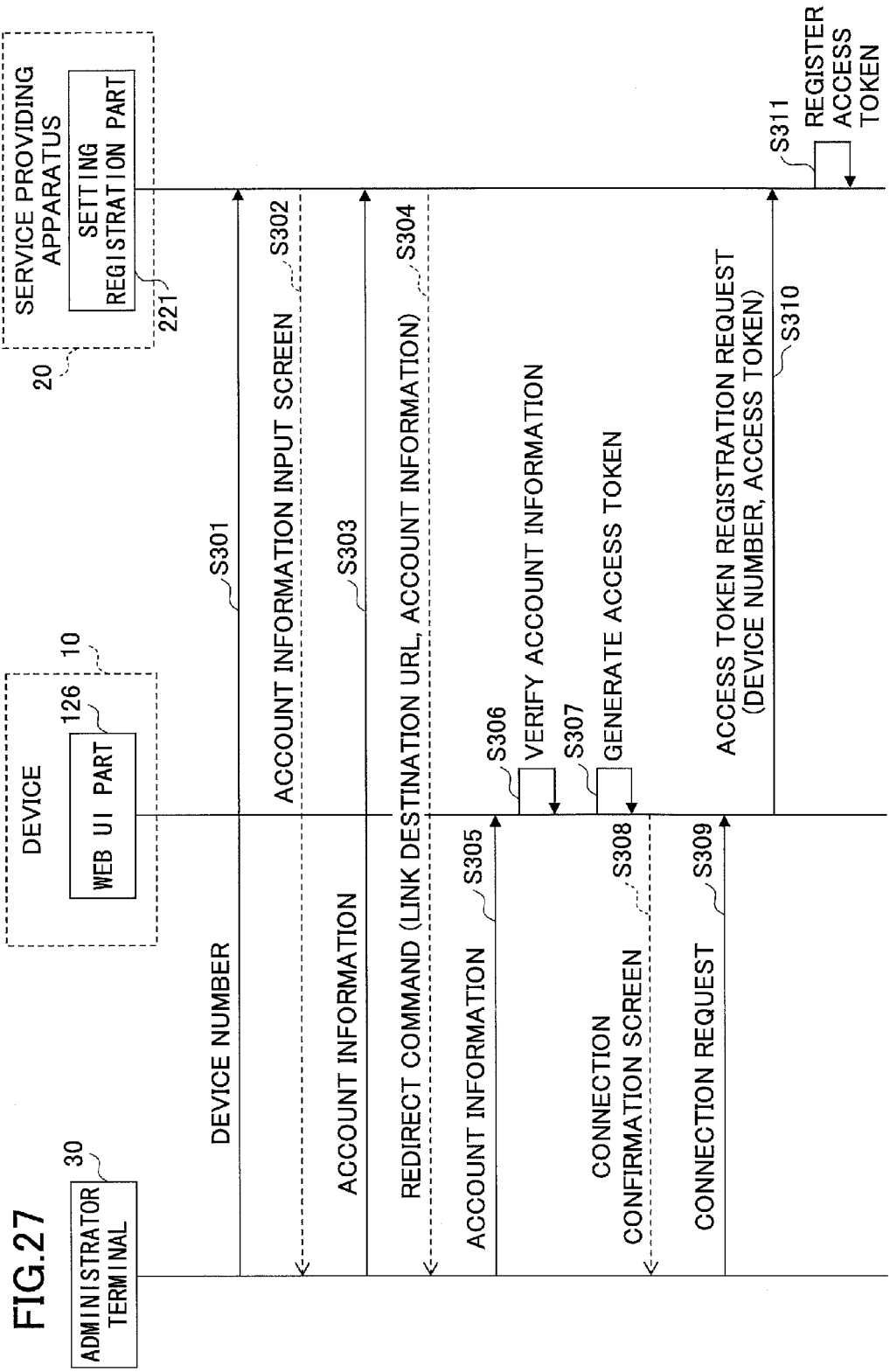
FIG. 27 is a sequence chart illustrating exemplary process steps of an access token registration process.
Figure 28:
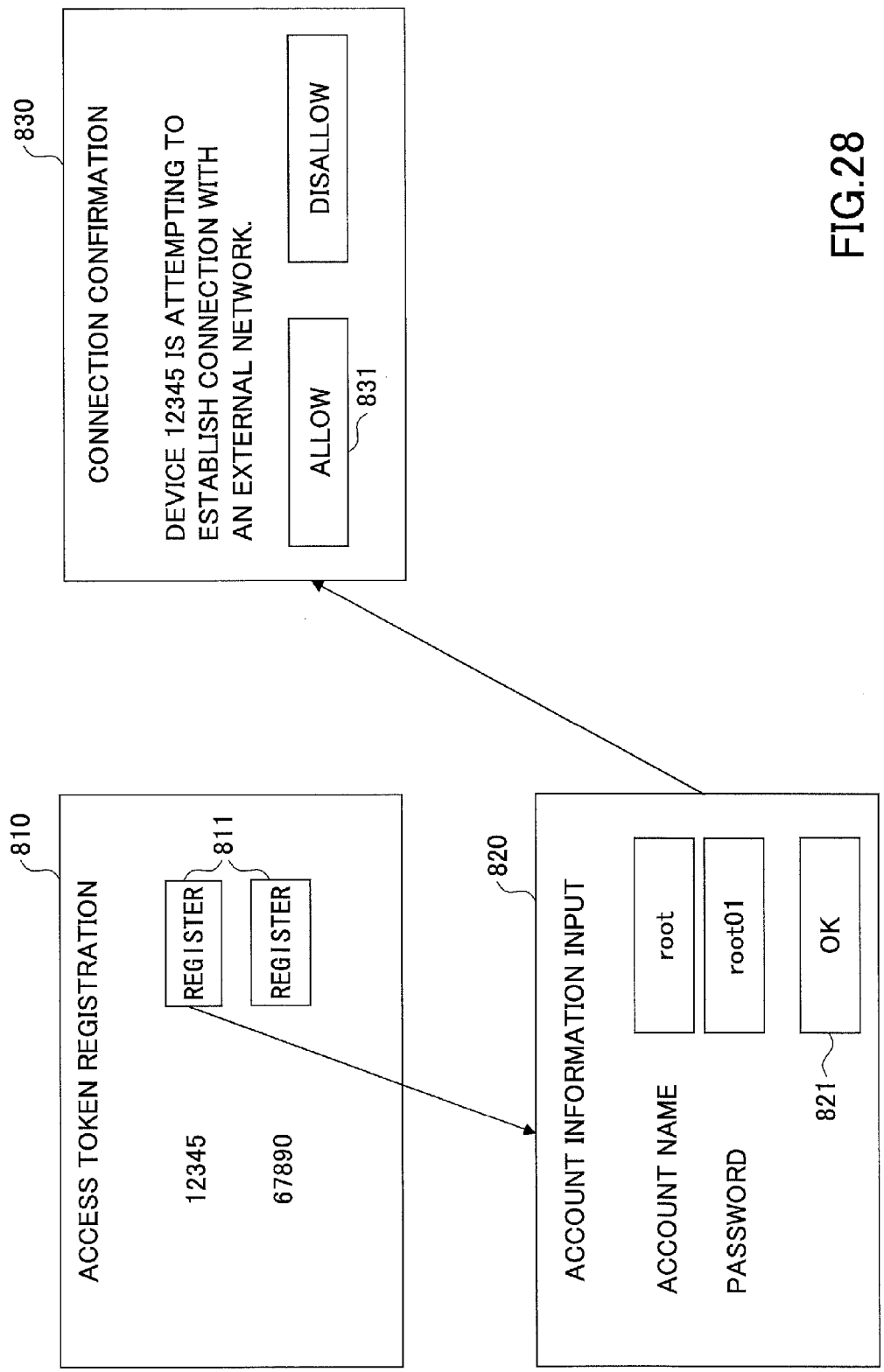
FIG. 28 illustrates exemplary screens that are displayed at the administrator terminal during the access token registration process.

FIG. 27 is a sequence chart illustrating exemplary process step of an access token registration process according to the third embodiment. FIG. 28 illustrates exemplary screens that may be displayed at the administrator terminal 30 during the access token registration. The process steps illustrated in FIG. 27 may be executed after the process steps of FIG. 6 are completed, or alternatively, the process steps of FIG. 27 may be inserted between steps S106-S116 of FIG. 6, for example.

At the start of the access token registration process of FIG. 27, the administrator terminal 30 displays an access token registration screen 810 as illustrated in FIG. 28. The access token registration screen 810 may display the device number of each device 10 having its device information registered in the device information storage part 232 and a register button 811 for each device 10, for example. The administrator terminal 30 displays the access token registration screen 810 based on a webpage provided by the setting registration part 221 of the service providing apparatus 20. The setting registration part 221 refers to the device information storage part 232 to generate the webpage for the access token registration screen 810.

When a register button 811 for a device 10 is selected (pressed) at the access token registration screen 810, the administrator terminal 30 transmits the device number of the device 10 associated with the selected register button 811 (referred to as "target device 10" hereinafter) to the setting registration part 221 (S301). Upon receiving the device number from the administrator terminal 30, the setting registration part 221 transmits a webpage for displaying an account information input screen 820 as illustrated in FIG. 28 to the administrator terminal 30 (S302). In turn, the administrator terminal 30 displays the account information input screen 820 based on the webpage received from the setting registration part 221.

When the administrator inputs account information of the target device 10 (e.g., account name and password) to the account information input screen 820 and presses an OK button 821, the administrator terminal 30 transmits the input account information to the setting registration part 221 (S303). Then, the setting registration part 221 transmits a redirect command designating the link destination URL of the target device 10 as the redirect destination to the administrator terminal 30 (S304). The redirect command includes account information of the target device 10. The setting registration part 221 may obtain the link destination URL of the target device 10 from the device information storage part 232 based on the device number received in step S301.

Next, the administrator terminal 30 transmits the account information to the web UI part 126 of the target device 10 corresponding to the redirect destination designated in the redirect command (S305). The web UI part 126 of the target device 10 verifies the accuracy of the account information (S306). For example, the web UI part 126 may determine that the account information transmitted from the administrator terminal 30 is accurate if the account information matches account information of the target device 10 that is registered beforehand. If the account information is accurate, the web UI part 126 generates an access token corresponding to the account information (S307). The access token may be a cookie, for example, or some other type of data. That is, the access token may be any form of data that enables verification of the legitimacy of a sender that sends an access request including this access token. The web UI part 126 may stored the generated access token in the RAM 112, for example.

Next, the web UI part 126 transmits a webpage for displaying a connection confirmation screen 830 as illustrated in FIG. 28 to the administrator terminal 30 (S308). In turn, the administrator terminal 30 displays the connection confirmation screen 830 based on the webpage. The connection confirmation screen 830 is a screen for inquiring whether to allow the target device 10 to establish connection with an external network outside the user environment E1 (i.e., the service providing apparatus 20).

When the administrator presses an allow button 831, the administrator terminal 30 transmits a connection request to the web UI part 126 of the target device 10 (S309). Upon receiving the connection request, the communication part 123 of the target device 10 transmits an access token registration request to the setting registration part 221 of the service providing apparatus 20 (S310). The access token registration request designates the access token generated in step S307 and stored in the RAM 112 and the device number of the target device 10. Upon receiving the access token registration request, the setting registration part 221 registers the access token in the record with the corresponding device number within the device information storage part 232.

By performing the above-described process steps, registration of the access token in the device information storage part 232 may be completed. Next, process steps for registering account information of the cooperation target storage are described below.

Figure 29:
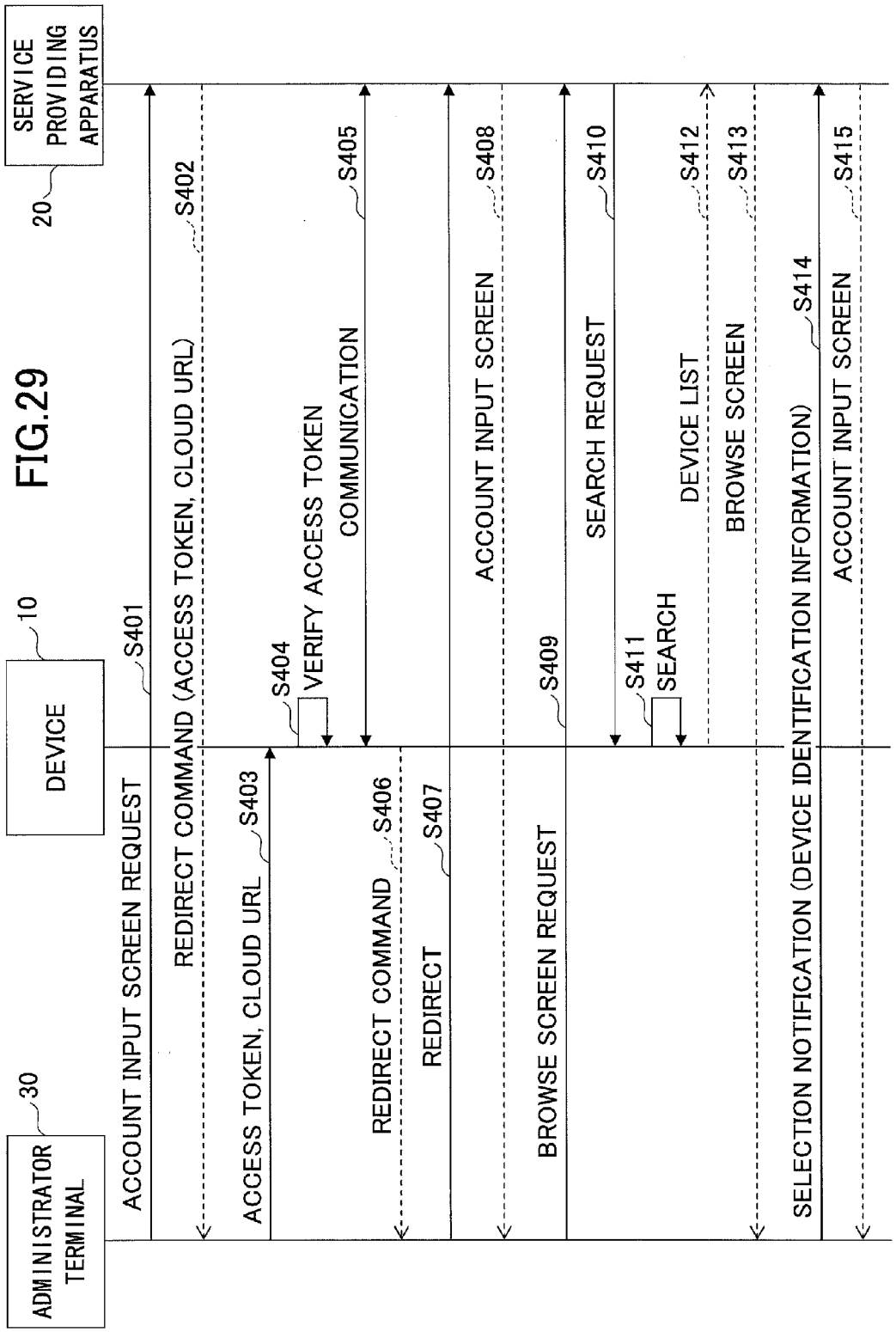
FIG. 29 is a sequence chart illustrating exemplary process steps for registering account information of a cooperation target storage according to the third embodiment.
Figure 30:
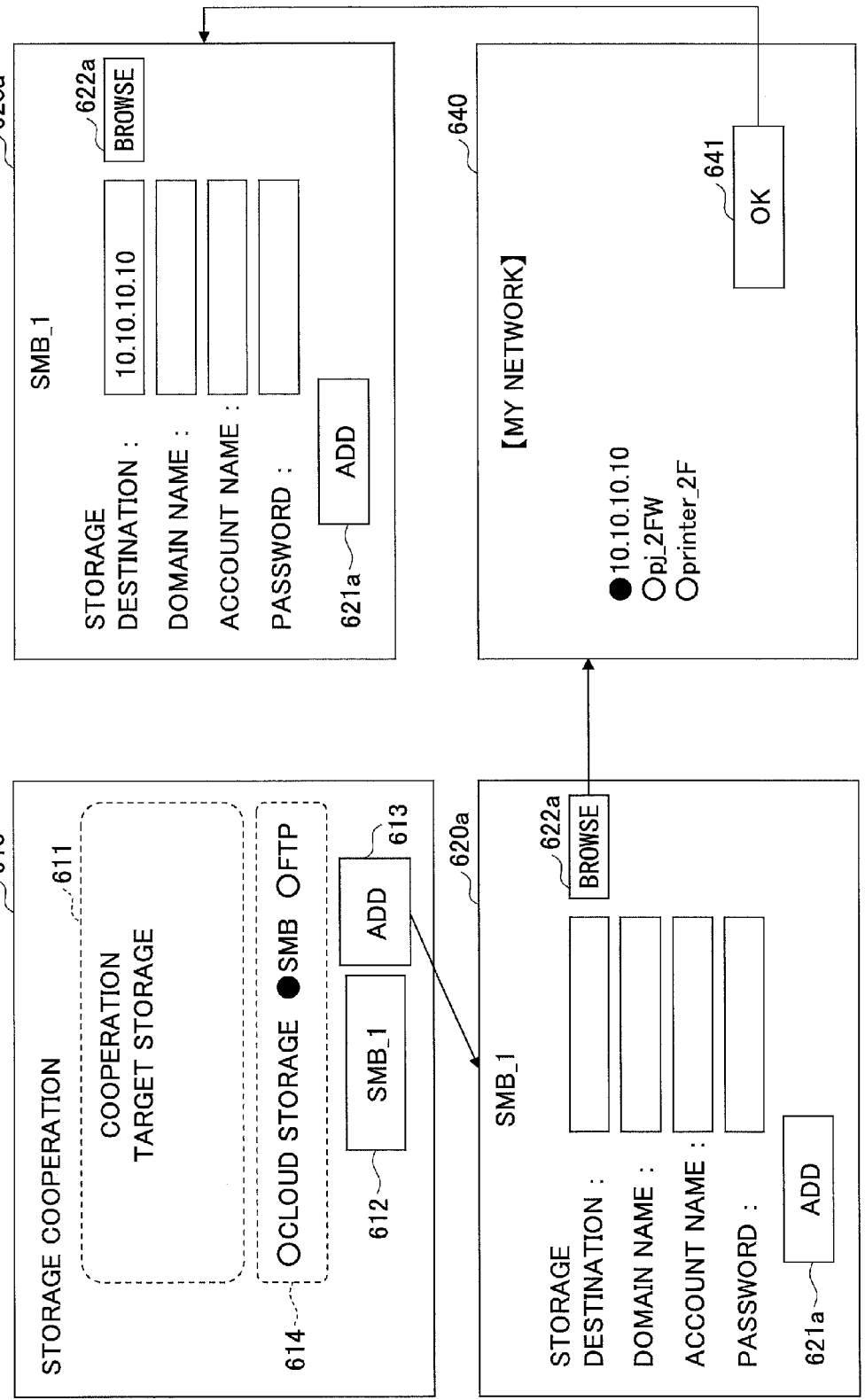
FIG. 30 illustrates exemplary screens for registering account information of the cooperation target storage according to the third embodiment.

FIG. 29 is a sequence chart illustrating exemplary process steps for registering account information of the cooperation target storage according to the third embodiment. FIG. 30 illustrates exemplary screens for registering the account information of the cooperation target storage according to the third embodiment. Note that features illustrated in FIG. 30 that are identical to those illustrated in FIG. 21 are given the same reference numerals and their descriptions are omitted.

At the start of the process of FIG. 29, the administrator terminal 30 displays the storage cooperation screen 610 as illustrated in FIG. 30.

When the administrator inputs a storage name in the cooperation target input area 612, selects a storage type at the storage type selection area 614, and presses the add button 613 of the storage cooperation screen 610, the administrator terminal 30 transmits an acquisition request for an account input screen to the setting registration part 221 of the service providing apparatus 20 (S401). In the present example, it is assumed that "SMB" has been selected as the storage type. Thus, the administrator terminal 30 transmits an acquisition request for the SMB account input screen 620a.

Upon receiving such acquisition request from the administrator terminal 30, the setting registration part 221 transmits a redirect command to the administrator terminal 30 (S402). The redirect command includes the access token of the device information associated with the organization ID of the login administrator and designates the link destination URL of this device information as the redirect destination. The redirect command also includes a cloud URL. The cloud URL corresponds to a URL of the setting registration part 221.

Next, the administrator terminal 30 transmits the access token and the cloud URL included in the redirect command to the web UI part 126 of the device 10 corresponding to the redirect destination of the redirect command (S403). In turn, the web UI part 126 verifies the received access token (S404). If the access token is verified, the communication part 123 of the device 10 establishes a bidirectional communication path with the device communication part 222 of the service providing apparatus 20 (S405). For example, WebSocket may be used to establish the bidirectional communication path.

Next, the web UI part 126 transmits a redirect command designating the cloud URL received in step S403 as the redirect destination to the administrator terminal 30 (S406). In turn, the administrator terminal 30 accesses the setting registration part 221 according to the redirect command (S407). In response to such access, the setting registration part 221 transmits a webpage for displaying the SMB account input screen 620a to the administrator terminal 30 (S408). The administrator terminal 30 then displays the SMB account input screen 620a as illustrated in FIG. 30 based on the webpage from the setting registration part 221.

The SMB account input screen 620*a* illustrated in FIG. 30 includes a browse button 622*a*. When the browse button 622*a* is pressed by the administrator, the administrator terminal 30 transmits an acquisition request for a webpage for displaying a browse screen 640 as illustrated in FIG. 30 to the setting registration part 221 of the service providing apparatus 20 (S409).

Upon receiving such an acquisition request from the administrator terminal 30, the device communication part 222 of the service providing apparatus 20 uses the communication path established in step S405 to transmit a device search request to the communication part 123 of the device 10 (S410). Because the established communication path allows bidirectional communication, the search request may reach the communication part 123 of the device 10 without being blocked by the firewall F1.

When the communication part 123 receives the search request from the device communication part 222, the search part 127 of the device 10 searches for devices connected to the network of the user environment E1 (S411). Note that any known discovery method such as the broadcast method may be used to search for the devices connected to the network of the user environment E1. Because the search involves discovering devices that are connected to the same LAN as the device 10, discovery of the devices corresponding to the search targets may be facilitated by having the device 10 conduct the search.

Next, the communication part 123 uses the bidirectional communication path to transmit a list of identification information (e.g., IP address and host name) of the devices searched and discovered by the search part 127 (such list being referred to as "device list" hereinafter) to the device communication part 222 of the service providing apparatus 20 (S412). Next, the setting registration part 221 of the service providing apparatus 20 generates a webpage for displaying the browse screen 640 illustrated in FIG. 30 based on the device list transmitted from the communication part 123 of the device 10. The setting registration part 221 then transmits the generated webpage to the administrator terminal 30 (S413). In turn, the administrator terminal 30 displays the browse screen 640 based on the webpage received from the setting registration part 221. The browse screen 640 displays the device list and includes radio buttons for enabling selection of one of the devices listed in the device list.

When the administrator selects a device to be added as a storage destination for image data (the file server 50 in the present example) at the browse screen 640 and presses an OK button 641, the administrator terminal 30 transmits the identification information of the selected device to the setting registration part 221 of the service providing apparatus 20 (S414). In turn, the setting registration part 221 generates a webpage for displaying the SMB account input screen 620*a* with the identification information of the selected device designated as the storage destination. Then, the setting registration part 221 transmits the generated webpage to the administrator terminal 30 (S415).

The administrator terminal 30 displays the SMB account input screen 620*a* based on the webpage received from the setting registration part 221. In the example illustrated in FIG. 30, the SMB account input screen 620*a* displayed after the OK button 641 of the browse screen 640 is pressed (see SMB account input screen 620*a* pointed by the arrow extending from the OK button 641) has the identification information of the device selected at the browse screen 640 designated as the storage destination.

Note that screens displayed and the process steps executed after the above processes may be identical to the second embodiment so that their descriptions are omitted.

As can be appreciated, according to an aspect of the third embodiment, the user (administrator) does not have to input the identification information of the device to be added (designated) as a storage destination one character at a time at the SMB account input screen 620*a*. Instead, the user may select the identification information of the device via the browse screen 640 to designate the device to be added as the storage destination.

In the following, a fourth embodiment of the present invention is described. The fourth embodiment is an exemplary modification of the third embodiment. Accordingly, it may be assumed that features of the fourth embodiment that are not particularly described below are identical to the third embodiment.

In the fourth embodiment, the storage cooperation screen 610 illustrated in FIG. 30 is provided by the web UI part 126 of the device 10. Specifically, in the fourth embodiment, when the administrator terminal 30 transmits an acquisition request for the storage cooperation screen 610 to the setting registration part 221 of the service providing apparatus 20, the setting registration part 221 transmits (returns) to the administrator terminal 30 a redirect command including the access token of the device information associated with the organization ID of the login administrator and designating the link destination URL of this device information as the redirect destination. Based on the redirect command from the setting registration part 221, the administrator terminal 30 transmits an acquisition request for the storage cooperation screen 610 designating the access token included in the redirect command to the web UI part 126 of the device 10 corresponding to the link destination URL included in the redirect command. The web UI part 126 verifies the access token, and if the access token is legitimate, the web UI part 126 transmits a webpage for displaying the storage cooperation screen 610 to the administrator terminal 30. In turn, the administrator terminal 30 displays the storage cooperation screen 610 based on the webpage from the web UI part 126. In the following, process steps that are executed after the above-described process steps are described with reference to FIG. 31.

Figure 31:
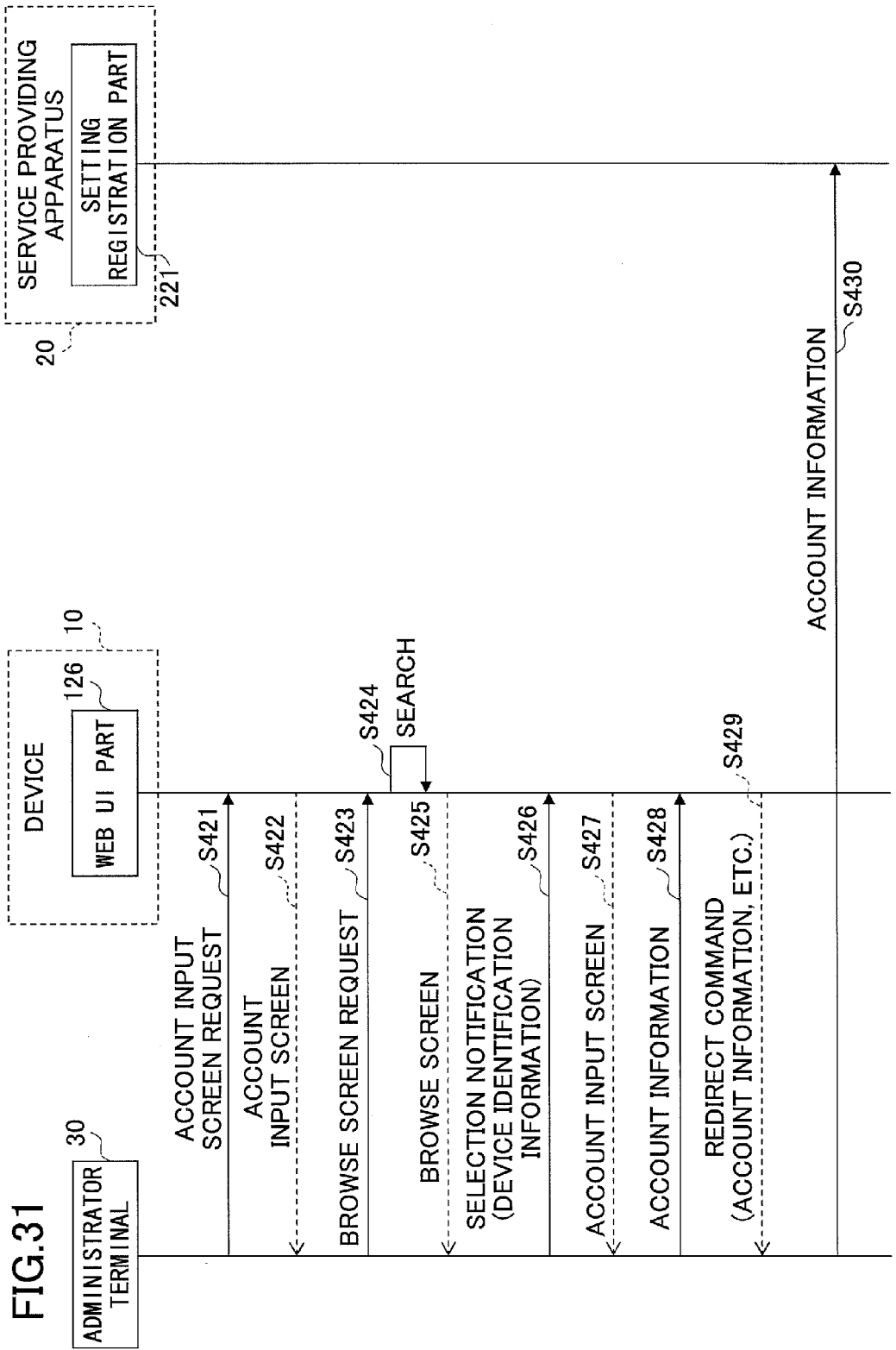
FIG. 31 is a sequence chart illustrating process steps for registering account information of a cooperation target storage according to a fourth embodiment of the present invention.

FIG. 31 is a sequence chart illustrating exemplary process steps for registering account information of the cooperation target storage according to the fourth embodiment. Note that the screens illustrated in FIG. 30 for registering the account information of the cooperation target storage according to the third embodiment may similarly be used in the fourth embodiment.

When the administrator inputs a storage name in the cooperation target input area 612, selects the storage type at the storage type selection area 614, and presses the add button 613 at the storage cooperation screen 610, the administrator terminal 30 transmits an acquisition request for an account input screen to the web UI part 126 of the device 10 (S421). In the present example, it is assumed that "SMB" has been selected as the storage type. Thus, the administrator terminal 30 transmits an acquisition request for the SMB account input screen 620*a*.

Upon receiving the acquisition request, the web UI part 126 transmits (returns) a webpage for displaying the SMB account input screen 620*a* to the administrator terminal 30 (S422). The administrator terminal 30 then displays the SMB account input screen 620*a* as illustrated in FIG. 30 based on the webpage transmitted from the web UI part 126.

When the administrator presses the browse button 622a, the administrator terminal 30 transmits an acquisition request for a webpage for displaying the browse screen 640 illustrated in FIG. 30 to the web UI part 126 (S423). When the acquisition request is received by the web UI part 126, the search part 127 of the device 10 searches for devices that are connected to the network of the user environment E1 (S424). Then, the web UI part 126 generates the webpage for displaying the browse screen 640 illustrated in FIG. 30 based on the device list of the devices searched and discovered by the search part 127. Then, the web UI part 126 transmits the generated webpage to the administrator terminal 30 (S425).

When the administrator selects a device to be added as a storage destination for image data (the file server 50 in the present example) at the browse screen 640 and presses the OK button 641, the administrator terminal 30 transmits the identification information of the selected device to the web UI part 126 of the device 10 (S426). In turn, the web UI part 126 generates a webpage for displaying the SMB account input screen 620a with the identification information of the selected device designated as the storage destination. Then, the web UI part 126 transmits the generated webpage to the administrator terminal 30 (S427).

The administrator terminal 30 displays the SMB account input screen 620a based on the webpage received from the web UI part 126. In the example illustrated in FIG. 30, the SMB account input screen 620a displayed after the OK button 641 of the browse screen 640 is pressed (see SMB account input screen 620a pointed by the arrow extending from the OK button 641) has the identification information of the device selected at the browse screen 640 designated as the storage destination.

Next, when the administrator inputs account information such as the domain name, account name, and password of the storage destination in the SMB account input screen 620a and presses the add button 621a, the administrator terminal 30 designates the input account information (identification information, domain name, account name, and password of the storage destination) in a registration request for registering the cooperation target storage account information and transmits the registration request to the web UI part 126 (S428).

Upon receiving the registration request from the administrator terminal 30, the web UI part 126 transmits a redirect command designating the setting registration part 221 of the service providing apparatus 20 as the redirect destination to the administrator terminal 30 (S429). The redirect command designates the account information included in the registration request and the storage name input to the storage cooperation screen 610 of FIG. 30. Based on the redirect command, the administrator terminal 30 transmits a registration request for registering the storage name and account information of the designated cooperation target storage to the setting registration part 221 of the service providing apparatus 20 (S430). Upon receiving such a registration request from the administrator terminal 30, the setting registration part 221 registers the account information such as the storage name, IP address, domain name, account name, and password designated in the registration request as storage account information of the organization record stored in association with the organization ID of the login administrator in the user information storage part 231 (see FIG. 22).

As can be appreciated from the above, advantageous effects similar to those achieved in the third embodiment may also be achieved in the fourth embodiment. That is, by enabling the administrator to select a storage destination from the browse screen 640 as illustrated in FIG. 30, the administrator does not have to input the identification information of the storage destination one character at a time at the SMB account input screen 620a.

In the following, a fifth embodiment of the present invention is described. The fifth embodiment is an exemplary modification of the second embodiment. Accordingly, it may be assumed that features of the fifth embodiment that are not particularly described below are identical to the second embodiment.

Figure 32:
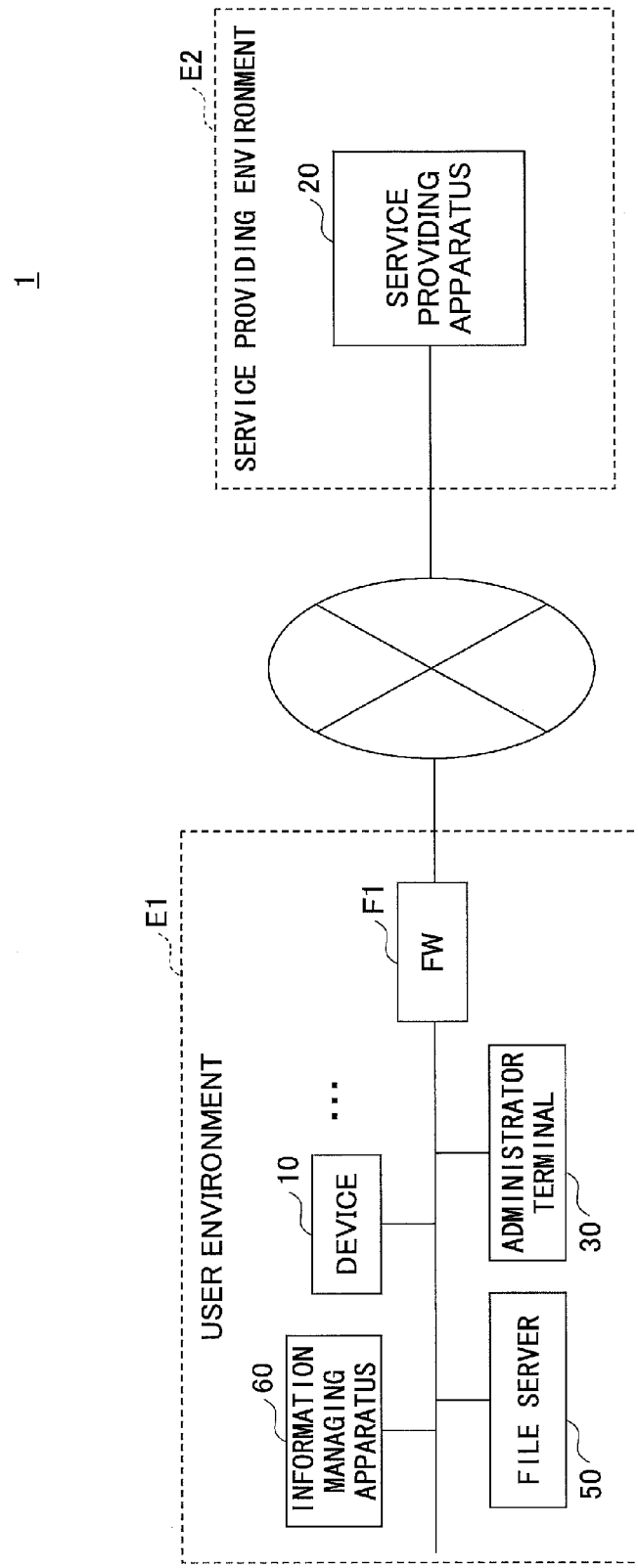
FIG. 32 illustrates an exemplary configuration of an information processing system according to a fifth embodiment of the present invention.

FIG. 32 illustrates an exemplary configuration of the information processing system 1 according to the fifth embodiment. Note that components illustrated in FIG. 32 that are identical to those illustrated in FIG. 20 are given the same reference numerals and their descriptions are omitted.

In FIG. 32, the user environment E1 includes an information managing apparatus 60. The information managing apparatus 60 stores information that is used by the device 10 upon executing the ScanToStorage service.

Figure 33:
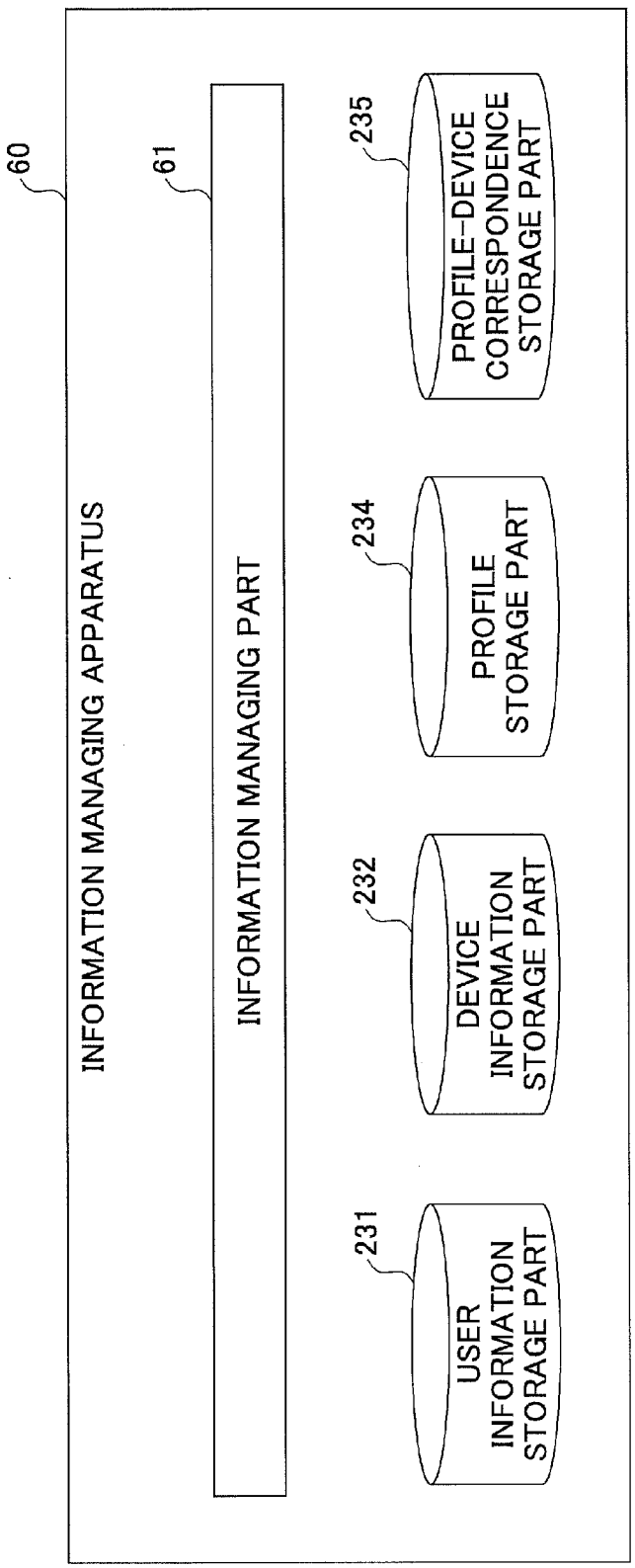
FIG. 33 illustrates an exemplary functional configuration of an information managing apparatus according to the fifth embodiment.

FIG. 33 illustrates an exemplary functional configuration of the information managing apparatus 60. Note that functional components illustrated in FIG. 33 that are identical to those illustrated in FIG. 4 are given the same reference numerals and their descriptions are omitted.

In FIG. 33, the information managing apparatus 60 includes the user information storage part 231, the device information storage part 232, the profile storage part 234, and the profile-device correspondence storage part 235. These storage parts may be implemented by a storage device of the information managing apparatus 60, for example. The information managing apparatus 60 also includes an information managing part 61. The information managing part 61 is configured to register information in the above storage parts, and search information from these storage parts, for example.

As can be appreciated, the fifth embodiment differs from the previously-described embodiments in that information relating to the user environment E1 is managed within the user environment E1. Some users may feel hesitant about having information relating to the user environment E1 managed outside the user environment E1. The fifth embodiment may be suitable for such users. Accordingly, in the fifth embodiment, the service providing apparatus 20 does not have to include the user information storage part 231, the device information storage part 232, the profile storage part 234, and the profile-device correspondence storage part 235. Alternatively, in certain embodiments, each user environment E1 may be able to select whether to have the storage parts storing relevant information managed at the service providing apparatus 20 outside the user environment E1 or at the information managing apparatus 60 within the user environment E1.

In certain embodiments, registration of information in the storage parts may be performed directly from the administrator terminal 30 to the information managing apparatus 60. In other embodiments, in view of compatibility demands, registration of the information may be performed by the process steps illustrated in FIG. 34, for example.

FIG. 34 is a sequence chart illustrating exemplary process steps of a registration process for registering information in the information managing apparatus 60.

In step S501, the administrator terminal 30 designates registration information in a registration request and transmits the registration request to the setting registration part 221 of the service providing apparatus 20.

Note that step S501 may correspond to step S101, S105, S111, S113, or S115 of FIG. 6, for example. Thus, the registration information in step S501 may vary depending on whether step S501 corresponds to step S101, S105, S111, S113, or S115.

Upon receiving the registration request from the administrator terminal 30, the setting registration part 221 transmits a redirect command designating the information managing part 61 of the information managing apparatus 60 as the redirection destination to the administrator terminal 30 (S502). The redirect command designates the registration information to be registered. Based on the redirect command, the administrator terminal 30 transmits a registration request for registering the registration information to the information managing part 61 of the information managing apparatus 60 (S503). Upon receiving the registration request from the administrator terminal 30, the information managing part 61 registers the registration information in the corresponding storage part (e.g., the user information storage part 231, the device information storage part 232, the profile storage part 234, or the profile-device correspondence storage part 235).

In the fifth embodiment, the scan device application 125 may obtain desired information from the information managing apparatus 60 upon executing the ScanToStorage service, for example.

As can be appreciated, according to an aspect of the fifth embodiment, information relating to the user environment E1 may be managed within the user environment E1.

Note that although the embodiments described above relate to exemplary applications of the ScanToStorage service in which a scanner inputs image data and the image data is output to a storage, the input and output of the image data may also be performed using devices other than a scanner and a storage. For example, a digital camera (including a cell phone having a digital camera function), a whiteboard, or some other type of image input device may be used to input the image data. In the case where a digital camera is used, image data captured by the digital camera may be input. In the case where a whiteboard is used, scanned image data of writings made on the whiteboard may be input. Also, image data may be input by an information terminal such as a smartphone that has installed an application for executing a function similar to that of a scanner, for example.

Also, an image projecting apparatus such as a projector, a printer, a conference system, a portable terminal, or some other image output device may be used as the output destination of the image data, for example.

Further, other types of devices having image data input functions and image data output functions may be used to implement a service similar to the ScanToStorage service described above.

In a further embodiment, electronic data other than image data may be input as data subject to a storage service or some other information processing service. For example, audio data recorded by an IC recorder or text data generated by a PC (personal computer) may be input.

In such case, the device information stored in the device information storage part 232 may include information indicating the capability of a device, for example. Information indicating the capability of a device may include information on the functions of the device such as whether the device is capable of scanning, or whether the device is capable of projecting an image, for example. By including information indicating the capability of the device in the device information, the service providing apparatus 20 may refer to this information to determine whether a device corresponding to an output destination is capable of outputting image data. In this case, the service providing apparatus 20 may transmit image data to the device upon determining that the device is capable of outputting the image data, for example. The device corresponding to an output destination may be a device that is designated as the output destination in output destination cooperation information corresponding to a superclass of the storage cooperation information described above, for example.

Note that the service providing apparatus 20 corresponds to an exemplary embodiment of a first apparatus of the present invention. The file server 50 corresponds to an exemplary embodiment of a second apparatus of the present invention. The profile is an exemplary embodiment of screen information. The profile storage part 234 is an exemplary embodiment of a first storage part of the present invention. The storage cooperation part 228 is an exemplary embodiment of a transfer part of the present invention. The scan device application 125 is an exemplary embodiment of an acquisition part and a transmission part of the present invention. The scanner 12 is an exemplary embodiment of an input part of the present invention. The online storage system 40 is an exemplary embodiment of an apparatus that is capable of receiving a request from the first apparatus (service providing apparatus 20). Note that in some embodiments, the first apparatus (service providing apparatus 20) itself may correspond to the apparatus that is capable of receiving data from the first apparatus (service providing apparatus 20).

Although the present invention has been described above with reference to certain preferred embodiments, the present invention is not limited to these embodiments, and numerous variations and modifications may be made without departing from the scope of the present invention.

The present application is based on and claims the benefit of priority of Japanese Patent Application No. 2012-246015 filed on Nov. 8, 2012, the entire contents of which are hereby incorporated by reference.

What is claimed is:

1. An information processing system including a first apparatus that is connected to a first network and a device that is connected to a second network, the second network being connected to the first network via a blocking apparatus that blocks a request from the first network, the information processing system comprising:

a second apparatus that is connected to the device via the second network, the second apparatus being blocked by the blocking apparatus from receiving the request from the first apparatus;

wherein the device includes
an input part that inputs image data; and
a transmission part that
transmits the image data to the second apparatus via the second network in a case where an output destination of the image data corresponds to the second apparatus, and
transmits a transmission request to have the image data transmitted to the output destination to the first apparatus via the first network in a case where the output destination of the image data corresponds to a third apparatus that is not connected to the second network, wherein the first apparatus is configured to
acquire the image data along with associated information transmitted from the device,
determine and acquire user identification information, process information and the output destination information from a first storage part in correspondence with the associated information, the process information relating to a process to be performed on the image data, acquire, from the first storage part, screen information associated with the device, the screen information including device profile information that includes configuration information of one or more operation components to be displayed on an operation screen and information on a process to be executed in response to an operation of the operation screen, image data processing condition information, and image data output destination information for each of the one or more operation components, the first storage part storing the screen information in association with identification information of the device, determine whether the user identification information is associated with the output destination as information identifying a user that is able to use the first apparatus, perform the process on the image data based on the process information at the first apparatus upon determining that the user identification information is properly associated with the output destination information, and transmit the image data to the output destination after the process has been performed on the image data, and wherein the device includes a display control part that prompts a screen to be displayed based on the acquired screen information, the screen enabling selection of the one or more operation components;

the input part inputs the image data that has been processed based on according to the image data processing condition information for the operation component that is selected at the screen included in the device profile information of the acquired screen information;

the transmission part transmits the image data to the second apparatus or the first apparatus according to the image data output destination information for the selected operation component; and the first apparatus performs the process on the image data received from the device before transmitting the image data to the output destination in a case where an instruction for executing the process on the image data is included in the device profile information.

2. The information processing system as claimed in claim 1, wherein
the blocking apparatus of the second network that blocks the request from the first network corresponds to a firewall.

3. A device that is connected to a second network, the device being connected to a first apparatus that is connected to a first network via a blocking apparatus, provided on the second network, that blocks a request from the first network, and the device being connected to a second apparatus via the second network, the second apparatus being blocked from receiving the request from the first apparatus by the blocking apparatus, the device comprising:

an input part that inputs image data; and
a transmission part that
transmits the image data to the second apparatus via the second network in a case where an output destination of the image data corresponds to the second apparatus, and transmits a transmission request to have the image data transmitted to the output destination to the first apparatus via the first network in a case where the output destination of the image data corresponds to a third apparatus that is not connected to the second network, wherein the first apparatus is configured to
acquire the image data along with associated information transmitted from the device, determine and acquire user identification information, process information and the output destination information from a first storage part in correspondence with the associated information, the process information relating to a process to be performed on the image data, determine whether the user identification information is associated with the output destination as information identifying a user that is able to use the first apparatus, perform the process on the image data based on the process information at the first apparatus upon determining that the user identification information is properly associated with the output destination information, and transmit the image data to the output destination after the process has been performed on the image data, wherein the first apparatus acquires, from the first storage part, screen information associated with the device, the screen information including device profile infotination that includes configuration information of one or more operation components to be displayed on an operation screen and information on a process to be executed in response to an operation of the operation screen, image data processing condition information and image data output destination information for each of the one or more operation components, and the first storage part storing the screen information in association with identification information of the device;

the device further comprising a display control part that prompts a screen to be displayed based on the acquired screen information, the screen enabling selection of the one or more operation components; wherein the input part inputs the image data that has been processed according to the image data processing condition information for the operation component that is selected at the screen included in the device profile information of the acquired screen information; and the transmission part transmits the image data to the second apparatus or the first apparatus according to the image data output destination information for the selected operation component; and the first apparatus performs the process on the image data received from the device before transmitting the image data to the output destination in a case where an instruction for executing the process on the image data is included in the device profile information.

4. An information processing method that is executed by a device that is connected to a second network, the device being connected to a first apparatus that is connected to a first network via a blocking apparatus, provided on the second network, that blocks a request from the first network, and that is connected to a second apparatus via the second network, the second apparatus being blocked from receiving the request from the first apparatus by the blocking apparatus, the method comprising:

inputting image data;

transmitting the image data to the second apparatus via the second network in a case where an output destination of the image data corresponds to the second apparatus, or transmitting a transmission request to have the image data transmitted to the output destination to the first apparatus via the first network in a case where the output destination of the image data corresponds to a third apparatus that is not connected to the second network;

acquiring the image data along with associated information transmitted from the device;

determining and acquiring user identification information, process information and the output destination information from a first storage part in correspondence with the associated information, the process information relating to a process to performed on the image data;

determining whether the user identification information is associated with the output destination as information identifying a user that is able to use the first apparatus;

performing the process on the image data based on the process information at the first apparatus upon determining that the user identification information is properly associated with the output destination information;

transmitting the image data to the output destination after the process has been performed on the image data, acquiring, from the first storage part, screen information associated with identification information of the device, the screen information including device profile information that includes configuration information of one or more operation components to be displayed on an operation screen and information on a process to be executed in response to an operation of the operation screen, image data processing condition information and image data output destination information for each of the one or more operation components, and the first storage part storing the screen information in association with identification information of the device;

prompting a screen to be displayed based on the acquired screen information, the screen enabling selection of the one or more operation components;

inputting the image data that has been processed according to the image data processing condition information for the operation component that is selected at the screen included in the device profile information of the acquired screen information; and transmitting the image data to the second apparatus or the first apparatus according to the image data output destination information for the selected operation component, wherein the first apparatus performs the process on the image data received from the device before transmitting the image data to the output destination in a case where an instruction for executing the process on the image data is included in the device profile information.

5. The information processing system as claimed in claim 1, wherein the screen information further includes at least one set of screen layout information relating to information on the layout and size of operation components arranged within a tab window.

6. The device as claimed in claim 3, wherein the screen information further includes at least one set of screen layout information relating to information on the layout and size of operation components arranged within a tab window.

7. The information processing method as claimed in claim 4, wherein the screen information further includes at least one set of screen layout information relating to information on the layout and size of operation components arranged within a tab window.

* * * * *